(12) United States Patent
Karino

(10) Patent No.: US 8,019,008 B2
(45) Date of Patent: Sep. 13, 2011

(54) BASE STATION APPARATUS, COMMUNICATION TERMINAL APPARATUS, COMMUNICATION SYSTEM, AND COMMUNICATION METHOD

(75) Inventor: Shingo Karino, Kanagawa (JP)

(73) Assignee: Panasonic Corporation, Osaka (JP)

( * ) Notice: Subject to any disclaimer, the term of this patent is extended or adjusted under 35 U.S.C. 154(b) by 787 days.

(21) Appl. No.: 11/968,876

(22) Filed: Jan. 3, 2008

(65) Prior Publication Data

US 2008/0170633 A1    Jul. 17, 2008

(30) Foreign Application Priority Data

Jan. 11, 2007    (JP) ................. 2007-003888

(51) Int. Cl.
*H04K 1/10*    (2006.01)
*H04L 27/28*    (2006.01)

(52) U.S. Cl. ........ 375/260; 375/316; 375/324; 375/340; 375/343

(58) Field of Classification Search .............. 375/260, 375/316, 324, 340, 343
See application file for complete search history.

(56) References Cited

U.S. PATENT DOCUMENTS

| | | | |
|---|---|---|---|
| 7,609,752 B2* | 10/2009 | Fujii et al. ............... | 375/145 |
| 2004/0190598 A1 | 9/2004 | Seki et al. | |
| 2005/0232135 A1 | 10/2005 | Mukai et al. | |
| 2005/0281290 A1* | 12/2005 | Khandekar et al. ........... | 370/500 |
| 2007/0198623 A1 | 8/2007 | Karino | |
| 2009/0257411 A1 | 10/2009 | Shitara et al. | |
| 2009/0257427 A1 | 10/2009 | Shitara et al. | |
| 2009/0323642 A1 | 12/2009 | Tanno et al. | |
| 2010/0157940 A1 | 6/2010 | Shitara et al. | |

FOREIGN PATENT DOCUMENTS

| | | |
|---|---|---|
| JP | 8-097798 | 4/1996 |
| JP | 2002-335557 | 11/2002 |
| JP | 2003-264524 | 9/2003 |
| JP | 2009-177855 | 8/2009 |
| WO | 2006/134829 | 12/2006 |

OTHER PUBLICATIONS

English language Abstract of JP 2002-335557.
English language Abstract of JP 2003-264524.
English language Abstract of JP 8-097798.
Japan Office action, mail date is May 31, 2011.

* cited by examiner

*Primary Examiner* — Ted M Wang
(74) *Attorney, Agent, or Firm* — Greenblum & Bernstein, P.L.C.

(57) ABSTRACT

A base station apparatus, communication terminal apparatus, communication system, and communication method are provided that enable the data part transmission amount to be increased, that are resistant to frequency selective fading, and that enable a BS with low transmission loss to be selected. An OFDM transmitting apparatus 100 sets a power measurement pilot as one OFDM symbol in one frame, assigns power measurement pilot subcarrier numbers to base station apparatuses, and transmits a power measurement pilot according to common frame timing among the base station apparatuses, and a communication terminal apparatus 200 is equipped with an autocorrelator 210 that outputs a symbol synchronization signal, an autocorrelator 220 that finds an autocorrelation characteristic of a repeat waveform part that is a repetition of the same waveform having a cycle of ½ effective symbol length or a waveform with the sign reversed having a cycle of ½ effective symbol length from a received power measurement pilot, and an in-phase averaging section 230 that performs in-phase averaging in frame units of an autocorrelation characteristic of the repeat waveform part and detects the positional frame timing of a power measurement pilot on the time axis.

11 Claims, 17 Drawing Sheets

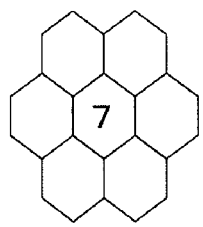
FIG.14A
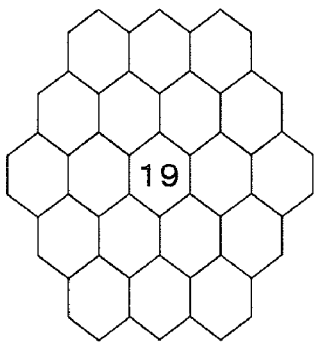
FIG.14B
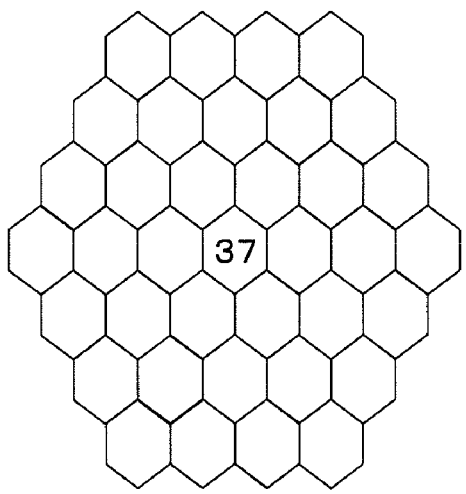
FIG.14C
NUMBER OF CELL REPETITIONS
```
BS1   : 2, 76, 150, . . . . . . . . . . . 890
BS2   : 4, 78, 152, . . . . . . . . . . 892
BS3   : 6, 80, 154, . . . . . . . . . . 894
        . . . . . . . . . .
BS37 : 74, 148, 222, . . . . . . . . . . 962
```
EXAMPLE OF SUBCARRIER ASSIGNMENT TO EACH BS
FIG.15

FRAME N

BS1  : 2, 76, 150, . . . . . . . . . . 890
BS2  : 4, 78, 152, . . . . . . . . . . 892
BS3  : 6, 80, 154, . . . . . . . . . . 894
       . . . . . . . . . .
BS37 : 74, 148, 222, . . . . . . . . . 962

FRAME N+1

BS1  : 74, 148, 222, . . . . . . . . . 962
BS2  : 2, 76, 150, . . . . . . . . . . 890
BS3  : 4, 78, 152, . . . . . . . . . . 892
       . . . . . . . . . .
BS37 : 72, 146, 220, . . . . . . . . . 960

FRAME N+2

BASE STATION APPARATUS, COMMUNICATION TERMINAL APPARATUS, COMMUNICATION SYSTEM, AND COMMUNICATION METHOD

CROSS REFERENCE TO RELATED APPLICATIONS

The disclosure of Japanese Patent Application No. 2007-003888 filed on Jan. 11, 2007 including the specification, drawings and abstract is incorporated herein by reference in its entirety.

BACKGROUND OF THE INVENTION

1. Field of the Invention

The present invention relates to a base station apparatus, communication terminal apparatus, communication system, and communication method that perform multicarrier communication.

2. Description of the Related Art

In recent years, various kinds of information apart from voice, such as images and data, have come to be transmitted in radio communications, and particularly in mobile communications. With the demand for the transmission of various kinds of content expected to continue to grow in the future, an increasing need for highly reliable, large-capacity, high-speed transmission is also anticipated. When high-speed transmission is performed in mobile communications, the effects of delayed waves due to multipath propagation cannot be ignored, and transmission characteristics degrade due to frequency selective fading.

Consequently, multicarrier modulation methods such as OFDM (Orthogonal Frequency Division Multiplexing) are attracting attention as one kind of technology for combating frequency selective fading. A multicarrier modulation method is a technology that achieves high-speed transmission by transmitting data using a plurality of carriers (subcarriers) whose transmission speed is suppressed to a level at which frequency selective fading does not occur. With the OFDM method, in particular, the subcarriers on which data is placed are mutually orthogonal, making this the multicarrier modulation method offering the highest spectral efficiency. Moreover, the OFDM method can be implemented with a comparatively simple hardware configuration. For these reasons, OFDM is an object of particular attention.

In mobile communications, a so-called multi-cell method is employed whereby an extensive communication area is provided by dividing the communication area into a plurality of planar zones called cells and deploying a base station apparatus (hereinafter also referred to as BS: Base Station) for each cell. A mobile communication apparatus (hereinafter also referred to as MS: Mobile Station) must perform a process called a cell search to select a BS with low transmission loss that is the most suitable for communication among a plurality of BSs in a multi-cell environment.

OFDM cell search methods have been disclosed, for example, in Patent Document 1 (Unexamined Japanese Patent Publication No. 2002-335557) and Patent Document 2 (Unexamined Japanese Patent Publication No. 2003-264524). Also, an OFDM modulation method has been disclosed in Patent Document 3 (Unexamined Japanese Patent Publication No. HEI 8-97798).

According to the communication apparatus description in Patent Document 1, a control channel area and data channel area are divided in the time-axis direction, a frequency in the control channel area is divided into a subcarrier group, each BS transmits a cell search channel assigned to a divided subcarrier group, and an MS measures the received field strength of a received cell search channel and determines if it is in a state in which communication with a BS is possible.

According to the description of a mobile station and base station apparatus in Patent Document 2, a data channel area and control channel area are divided into subcarriers, each BS transmits a control channel assigned to a specific subcarrier, and an MS receives only a subcarrier group to which a control channel is assigned and selects the optimal BS for communication based on control channel information.

Patent Document 3 discloses an OFDM modulator that reduces multipath interference by applying the properties of even-numbered and odd-numbered subcarriers in the OFDM modulation method.

FIG. 1 is a drawing showing the frequencies and frame configuration of a conventional OFDM system. In FIG. 1, the vertical axis indicates time and the horizontal axis indicates frequency. To be more specific, time on the vertical axis is shown by frame timings 1, 2, . . . , and frequency on the horizontal axis is shown by OFDM system subcarrier numbers 1, 2, . . . . Hatching in FIG. 1 indicates data.

As shown in FIG. 1, in a conventional OFDM system, in addition to the necessity of a null symbol 11 for detecting frame timing, a cell search channel 12 is also necessary for identifying a base station to be communicated with after null symbol 11 is detected, and thus one frame includes two OFDM symbols that are not communication data.

However, there are problems with this kind of conventional cell search method, as follows.

In the case of an apparatus described in Patent Document 1, a cell search channel itself does not include a means of differentiating itself from another symbol in the time-axis direction, and a special symbol is provided, separate from the cell search channel for received field strength measurement, that differentiates between a control channel area and a data channel area in the time-axis direction in order to identify the position of a cell search channel in the time-axis direction. There is thus a problem of the data part transmission amount being reduced.

In the case of an apparatus described in Patent Document 2, the BS to be communicated with is determined according to the size of the power average value of a control channel assigned to a specific subcarrier, and there is a problem of not being able to track fluctuations in subcarrier received power due to frequency selective fading.

In the case of an apparatus described in Patent Document 3, although the properties of even-numbered and odd-numbered subcarriers in OFDM are applied, it can hardly be said that the degree of loss in BS-MS communications is faithfully reflected, and furthermore time-axis direction timing identification is not mentioned at all.

SUMMARY OF THE INVENTION

It is an object of the present invention to provide a base station apparatus, communication terminal apparatus, communication system, and communication method that enable the data part transmission amount to be increased, that are resistant to frequency selective fading, and that enable a BS with low transmission loss suitable for communication to be selected.

According to an aspect of the invention, a base station apparatus that performs multicarrier communication is equipped with a setting section that provides a one-symbol power measurement pilot in one frame, an assignment section that assigns a subcarrier number of the power measurement pilot to each base station apparatus, and a transmitting section that transmits the power measurement pilot according to common frame timing among the base station apparatuses.

According to an aspect of the invention, a communication terminal apparatus that performs multicarrier communication is equipped with a receiving section that receives a power measurement pilot provided as one symbol in one frame, an autocorrelation section that finds an autocorrelation characteristic of a repeat waveform part that is a repetition of the same waveform having a cycle of ½ effective symbol length or a waveform with the sign reversed having a cycle of ½ effective symbol length from a received power measurement pilot, and a frame timing detection section that performs in-phase averaging in frame units of an autocorrelation characteristic of the repeat waveform part and detects the positional frame timing of a power measurement pilot on the time axis.

According to an aspect of the invention, in a communication system that performs multicarrier communication, a base station apparatus is equipped with a setting section that provides a one-symbol power measurement pilot in one frame, an assignment section that assigns a subcarrier number of the power measurement pilot to each base station apparatus, and a transmitting section that transmits the power measurement pilot according to common frame timing among the base station apparatuses; and a communication terminal apparatus is equipped with a receiving section that receives a power measurement pilot provided as one symbol in one frame, an autocorrelation section that finds an autocorrelation characteristic of a repeat waveform part that is a repetition of the same waveform having a cycle of ½ effective symbol length or a waveform with the sign reversed having a cycle of ½ effective symbol length from a received power measurement pilot, and a frame timing detection section that performs in-phase averaging in frame units of an autocorrelation characteristic of the repeat waveform part and detects the positional frame timing of a power measurement pilot on the time axis.

According to another aspect of the invention, a communication method that performs multicarrier communication executes, on the transmitting side, a step of providing a one-symbol power measurement pilot in one frame, a step of assigning a subcarrier number of the power measurement pilot to each base station apparatus, and a step of transmitting the power measurement pilot according to common frame timing among the base stations; and executes, on the receiving side, a step of receiving a power measurement pilot provided as one symbol in one frame, a step of finding an autocorrelation characteristic of a repeat waveform part that is a repetition of the same waveform having a cycle of ½ effective symbol length or a waveform with the sign reversed having a cycle of ½ effective symbol length from a received power measurement pilot, and a step of performing in-phase averaging in frame units of an autocorrelation characteristic of the repeat waveform part and detecting the positional frame timing of a power measurement pilot on the time axis.

BRIEF DESCRIPTION OF THE DRAWINGS

FIG. 8 is a flowchart showing processing that determines which base station a communication terminal apparatus according to above Embodiment 1 communicates with;

FIG. 14 is a drawing showing numbers of cell repetitions of an OFDM system according to Embodiment 3 of the present invention;

FIG. 15 is a drawing showing an example of subcarrier assignment of each BS of an OFDM system according to above Embodiment 3;

FIG. 16 is a drawing showing the relationship between numbers of cell repetitions of an OFDM system according to Embodiment 4 of the present invention and intervals of subcarriers on which a base station pilot is placed;

DETAILED DESCRIPTION OF THE PREFERRED EMBODIMENTS

With reference now to the accompanying drawings, embodiments of the present invention will be explained in detail below.

Embodiment 1

Figure 2:
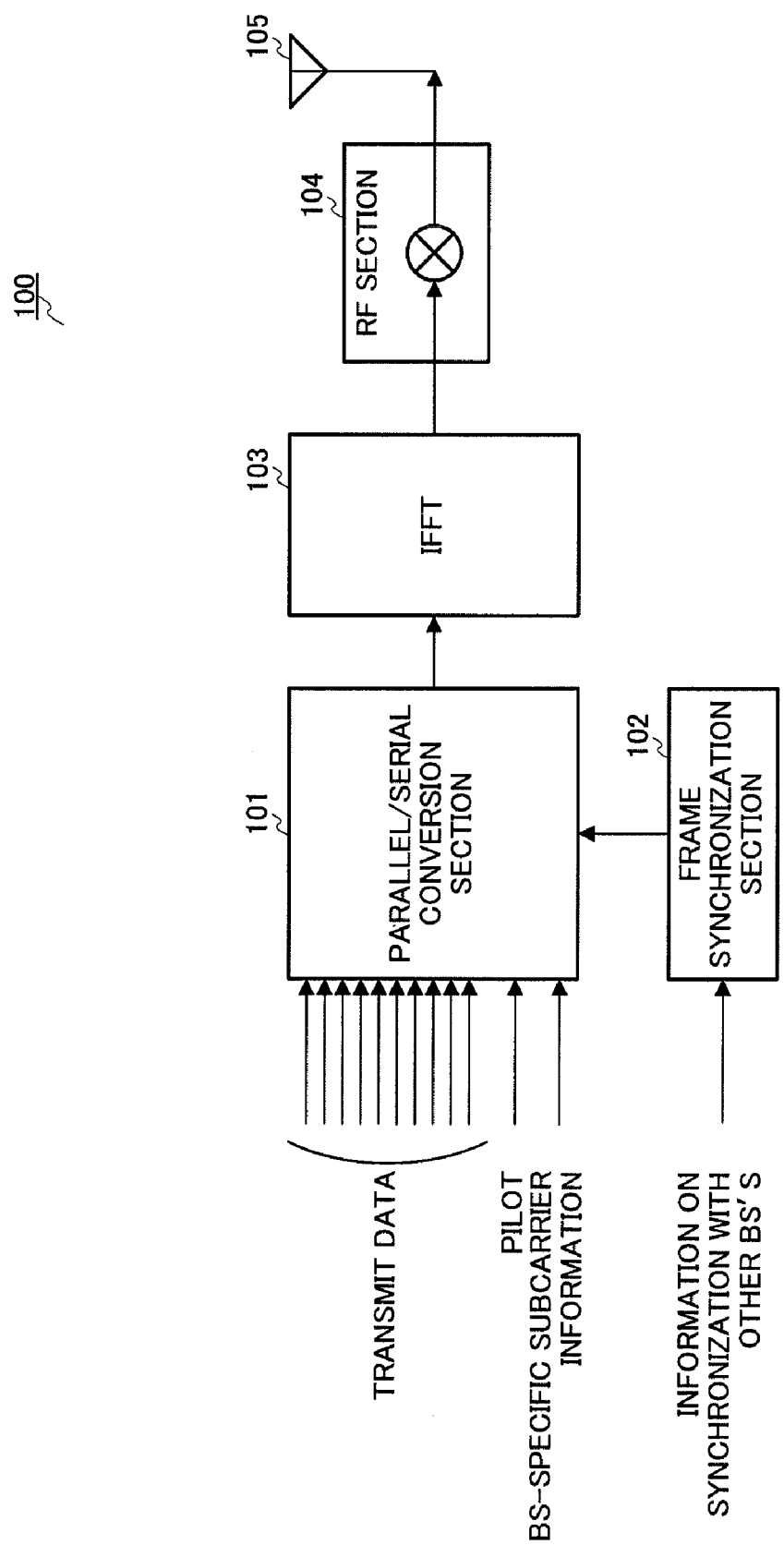
FIG. 2 is a block diagram showing the configuration of an OFDM transmitting apparatus according to Embodiment 1 of the present invention.

FIG. 2 is a block diagram showing the configuration of an OFDM transmitting apparatus according to Embodiment 1 of the present invention. A base station apparatus and communication terminal apparatus of this embodiment are examples of application to an OFDM communication apparatus.

In FIG. 2, an OFDM transmitting apparatus 100 is configured by means of a parallel/serial conversion section (P/S) 101, a frame synchronization section 102, an inverse fast Fourier transform section (IFFT) 103, an RF section 104, and a transmitting antenna 105.

A plurality of transmit data, pilot information, and base station (BS) specific information are input simultaneously to parallel/serial conversion section (P/S) 101, and parallel/serial conversion section (P/S) 101 converts this plurality of data to serial data at desired timing synchronized with a frame timing signal input from frame synchronization section 102, and outputs the converted data to IFFT 103.

Frame synchronization section 102 outputs a frame timing signal to parallel/serial conversion section (P/S) 101 based on synchronization information with respect to another adjacent base station.

Inverse fast Fourier transform section (IFFT) 103 converts time-axis data to frequency-axis data.

RF section 104 performs frequency conversion of the baseband frequency signal to an RF band frequency signal.

Transmitting antenna 105 transmits the RF band frequency signal aerially.

Parallel/serial conversion section (P/S) 101 has functions as a setting section that sets a power measurement pilot as one OFDM symbol in one frame and an assignment section that assigns a subcarrier number of the power measurement pilot to each base station apparatus. In this embodiment, an even number is assigned to the first base station apparatus, and other hitherto unassigned even numbers are assigned sequentially to other base station apparatuses. Also, above-described RF section 104 and transmitting antenna 105 have a function as a transmitting section that transmits a power measurement pilot according to common frame timing among base stations.

In OFDM transmitting apparatus 100, transmit data undergoes parallel/serial conversion by parallel/serial conversion section (P/S) 101, and a signal resulting from this parallel/serial conversion undergoes inverse fast Fourier transform processing by inverse fast Fourier transform section (IFFT) 103. By this means, a signal arranged on the frequency axis is converted to a time waveform, and an OFDM signal is obtained. An IFFT 103 output signal undergoes D/A conversion by a D/A conversion section (DAC) (not shown), and after amplification by an amplification section (AMP) (not shown), is transmitted from transmitting antenna 105.

Figure 3:
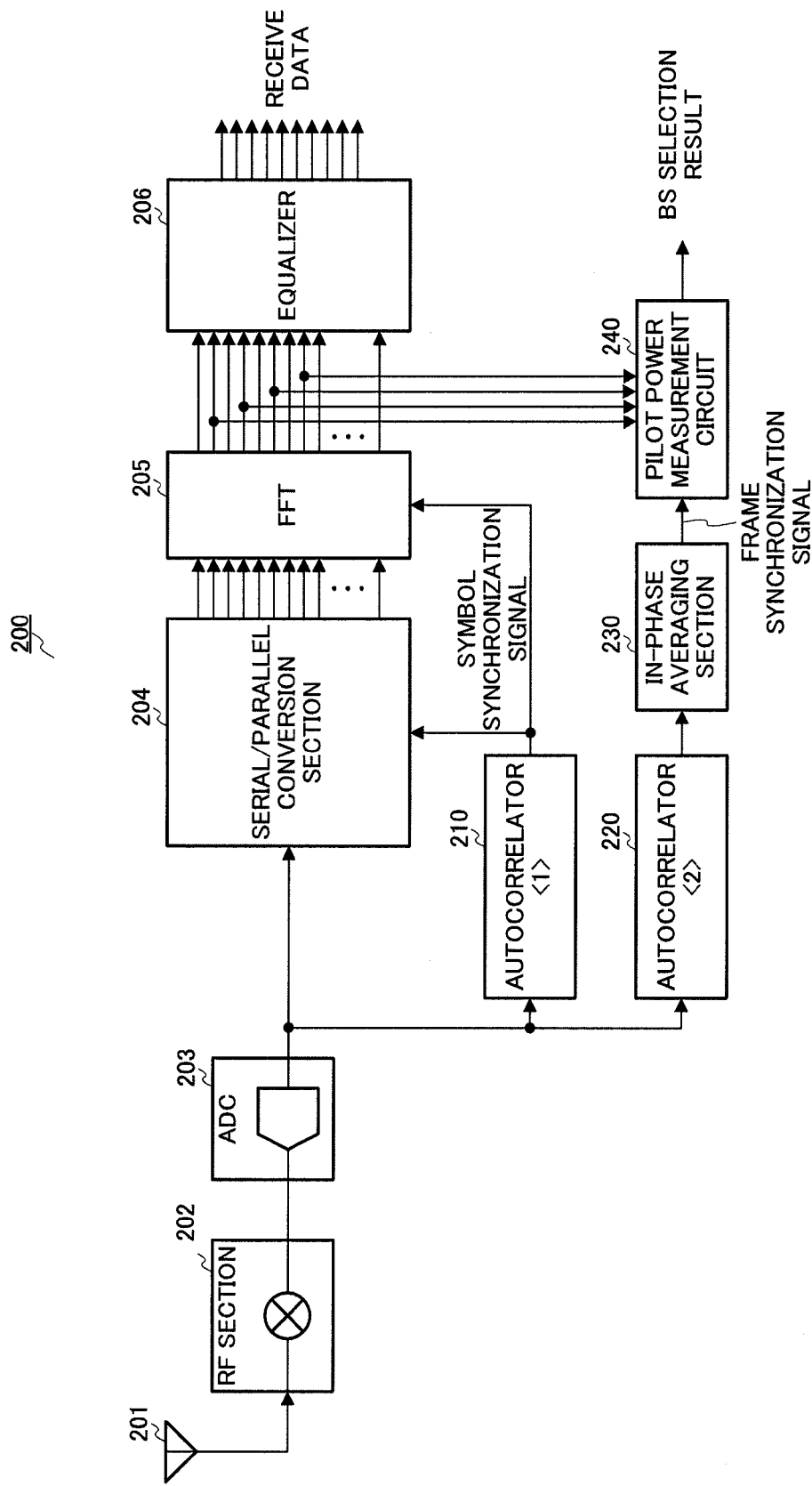
FIG. 3 is a block diagram showing the configuration of a communication terminal apparatus according to above Embodiment 1.

FIG. 3 is a block diagram showing the configuration of a communication terminal apparatus that receives transmit data from OFDM transmitting apparatus 100.

In FIG. 3, a communication terminal apparatus 200 is configured by means of a receiving antenna 201, an RF section 202, an A/D conversion section (ADC) 203, a serial/parallel conversion section (S/P) 204, a fast Fourier transform section (FFT) 205, an equalizer 206, an autocorrelator 210 (autocorrelator <1>), an autocorrelator 220 (autocorrelator <2>), an in-phase averaging section 230, and a pilot power measurement circuit 240.

Receiving antenna 201 receives an RF band frequency signal.

RF section 202 performs frequency conversion of the RF band frequency signal to a baseband frequency signal.

Above-described receiving antenna 201 and RF section 202 have a function as a receiving section that receives a power measurement pilot provided as one OFDM symbol in one frame.

A/D conversion section (ADC) 203 samples the effective symbol part of a received analog OFDM symbol based on a predetermined FFT size, and performs digital conversion.

Serial/parallel conversion section (S/P) 204 converts serial data to parallel data based on a timing signal from autocorrelator 210 (autocorrelator <1>).

Fast Fourier transform section (FFT) 205 converts a plurality of frequency-axis data to time-axis data based on a timing signal from autocorrelator 210 (autocorrelator <1>).

Equalizer 206 corrects distortion of FFT 205 output data based on pilot data received power and phase information, and extracts proper receive data.

Communication terminal apparatus 200 has autocorrelator 210 (autocorrelator <1>) for OFDM symbol timing and autocorrelator 220 (autocorrelator <2>) for frame timing.

Autocorrelator 210 (autocorrelator <1>) extracts OFDM symbol timing, and outputs an extracted symbol synchronization signal to serial/parallel conversion section (S/P) 204 and fast Fourier transform section (FFT) 205. The configuration of autocorrelator 210 (autocorrelator <1>) will be described in detail later herein with reference to FIG. 4.

Autocorrelator 220 (autocorrelator <2>) extracts frame timing from an OFDM signal, and outputs the extracted frame timing to in-phase averaging section 230. Autocorrelator 220 (autocorrelator <2>) has a function as an autocorrelation section that finds an autocorrelation characteristic of a repeat waveform part that is a repetition of the same waveform having a cycle of ½ effective symbol length from a received power measurement pilot. The configuration of autocorrelator 220 (autocorrelator <2>) will be described in detail later herein with reference to FIG. 5.

In-phase averaging section 230 can detect frame timing by performing averaging of autocorrelator 220 (autocorrelator <2>) autocorrelation results over a plurality of frames. In-phase averaging section 230 has a function as a frame timing detection section that performs in-phase averaging in frame units of an autocorrelation characteristic of the repeat waveform part and detects the positional frame timing of a power measurement pilot on the time axis. The detected frame timing is input to pilot power measurement circuit 240 as a frame synchronization signal. In-phase averaging section 230 frame-unit in-phase addition will be described later herein with reference to the flowchart in FIG. 8 and the waveform diagram in FIG. 9.

Pilot power measurement circuit 240 extracts pilot data from FFT 205 output together with a frame synchronization signal, and measures the power of the respective pilot signals.

In particular, pilot power measurement circuit 240 performs subcarrier power calculation based on the result of FFT demodulation of a preamble signal in which pilot signals of a plurality of base stations are modulated at frame timing, adds the power values of a pilot of the same base station arranged on each frequency of a plurality of offsets, and outputs a BS selection result for communicating with the base station with the highest power.

In communication terminal apparatus 200, an RF band frequency signal received by receiving antenna 201 is amplified by an LNA (Low Noise Amplifier) (not shown) and then undergoes frequency conversion to a baseband frequency signal by RF section 202 and A/D conversion by A/D conversion section (ADC) 203, and is input as an FFT 205 input signal. FFT 205 obtains a received signal of each subcarrier by executing fast Fourier transform processing on the input signal. Per-subcarrier received signals obtained by FFT 205 have data distortion corrected by equalizer 206, and are output as receive data to a later-stage demodulator (not shown).

Figure 4:
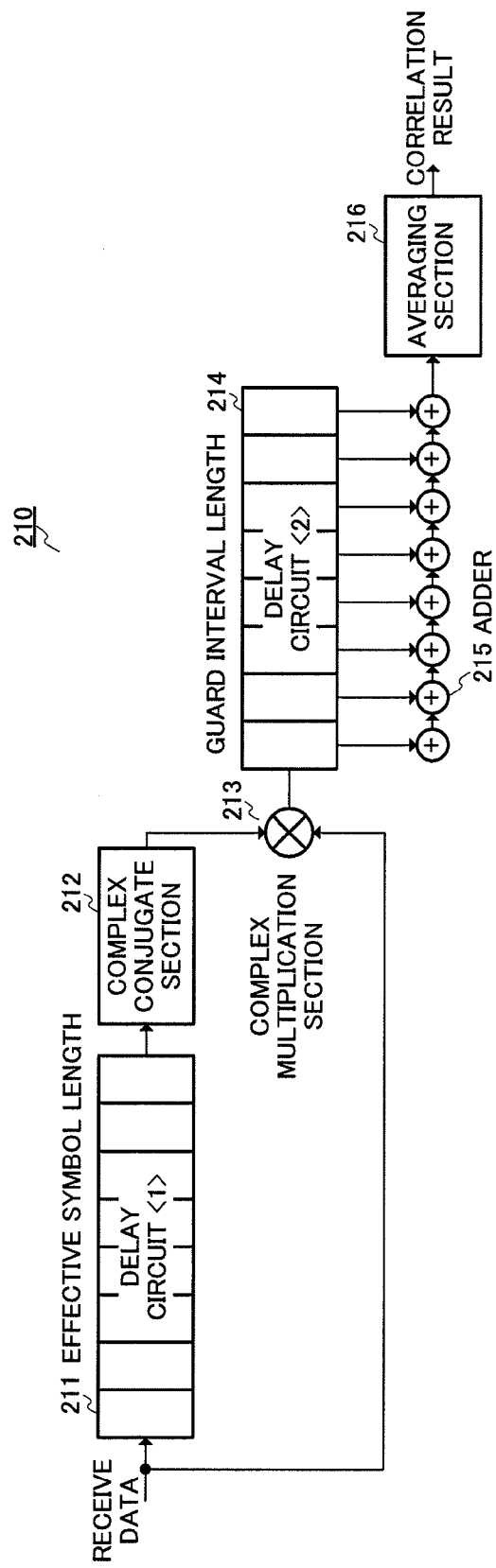
FIG. 4 is a circuit diagram showing the detailed configuration of an autocorrelator of a communication terminal apparatus according to above Embodiment 1.

FIG. 4 is a circuit diagram showing the detailed configuration of autocorrelator 210 (autocorrelator <1>). Autocorrelator 210 (autocorrelator <1>) has the same configuration in the case of even-numbered frequencies as in this embodiment, and in the case of odd-numbered frequencies as in Embodiment 2 described later herein.

In FIG. 4, autocorrelator 210 (autocorrelator <1>) is configured by means of an effective symbol length delay circuit 211 (delay circuit <1>), a complex conjugate section 212, a complex multiplication section 213, a guard interval length delay circuit 214 (delay circuit <2>) an adder 215, and an averaging section 216.

Effective symbol length delay circuit 211 (delay circuit <1>) comprises a shift register that causes an effective symbol length delay on a sampling clock basis.

Complex conjugate section 212 finds the delayed signal complex conjugate in order for complex multiplication between a delayed waveform and non-delayed waveform to be performed by complex multiplication section 213.

Complex multiplication section 213 performs complex multiplication of the delayed waveform and non-delayed waveform.

Guard interval length delay circuit 214 (delay circuit <2>) comprises a shift register that causes a guard interval length delay on a sampling clock basis.

Adder 215 adds all the sampling clock unit delay results of guard interval length delay circuit 214 (delay circuit <2>), and the addition result becomes an autocorrelation value.

Averaging section 216 divides the autocorrelation value by a number of ADC sampling points equivalent to a guard interval. Averaging section 216 is used to reduce the number of columns of the addition result.

Therefore, autocorrelator 210 (autocorrelator <1>) finds autocorrelation for a guard interval part and effective symbol start part, enabling symbol timing to be detected.

Figure 5:
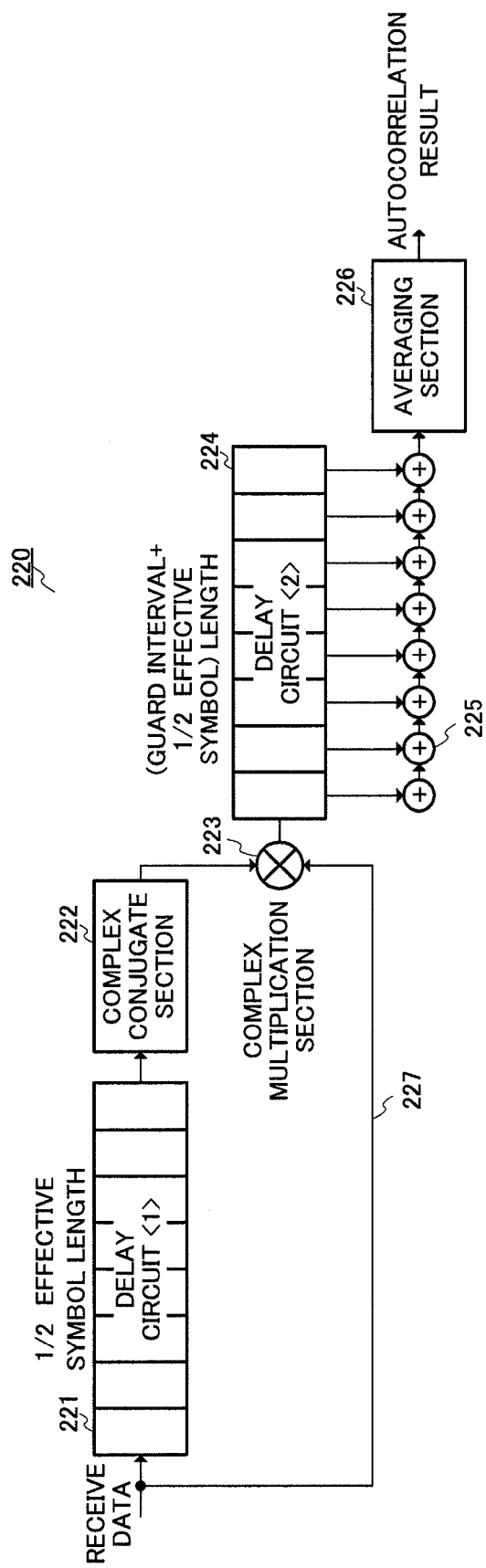
FIG. 5 is a circuit diagram showing the detailed configuration of an autocorrelator of a communication terminal apparatus according to above Embodiment 1.

FIG. 5 is a circuit diagram showing the detailed configuration of autocorrelator 220 (autocorrelator <2>)). This embodiment shows an autocorrelator <2> for even-numbered frequencies.

In FIG. 5, autocorrelator 220 (autocorrelator <2>) is configured by means of a ½ effective symbol length delay circuit 221 (delay circuit <1>), a complex conjugate section 222, a complex multiplication section 223, a (guard interval+½ effective symbol) length delay circuit 224 (delay circuit <2>), an adder 225, and an averaging section 226.

½ effective symbol length delay circuit 221 (delay circuit <1>) comprises a shift register that causes a ½ effective symbol length delay on a sampling clock basis.

The sampling clock frequency of A/D conversion section (ADC) 203 is determined beforehand. The length of one OFDM symbol is made up of (1) an effective symbol and (2) a guard interval. In an OFDM signal in which only even-numbered frequencies undergo inverse Fourier transform processing, a ½ effective symbol length signal is repeated twice, and therefore a waveform delayed by ½ effective symbol length by ½ effective symbol length delay circuit 221, and a non-delayed path 227 waveform, are identical waveforms.

Complex conjugate section 222 finds the delayed signal complex conjugate in order for complex multiplication between a delayed waveform and non-delayed waveform to be performed by complex multiplication section 223.

Complex multiplication section 223 performs complex multiplication of the delayed waveform and non-delayed waveform.

(Guard interval+½ effective symbol) length delay circuit 224 (delay circuit <2>) comprises a shift register that causes a delay equivalent to a time period resulting from adding together a ½ effective symbol length and guard interval length on a sampling clock basis.

Adder 225 adds all the sampling clock unit delay results of (guard interval+½ effective symbol) length delay circuit 224 (delay circuit <2>), and the addition result becomes an autocorrelation value.

Averaging section 226 divides the autocorrelation value by a number resulting from adding together (1) the number of ADC sampling points equivalent to a guard interval and (2) the number of ADC sampling points equivalent to ½ effective symbol length. Averaging section 226 is used to reduce the number of columns of the addition result.

For both the above-described ½ effective symbol length delay circuit 221 (delay circuit <1>) one-stage shift register and the above-described (guard interval+½ effective symbol) length delay circuit 224 (delay circuit <2>) one-stage shift register, only the number of bits of A/D conversion section (ADC) 203 need to be secured. Here, since the columns of the addition result increase, the number of columns is suppressed by averaging section 226.

The operation of a communication terminal apparatus configured as described above will now be explained.

Figure 6:
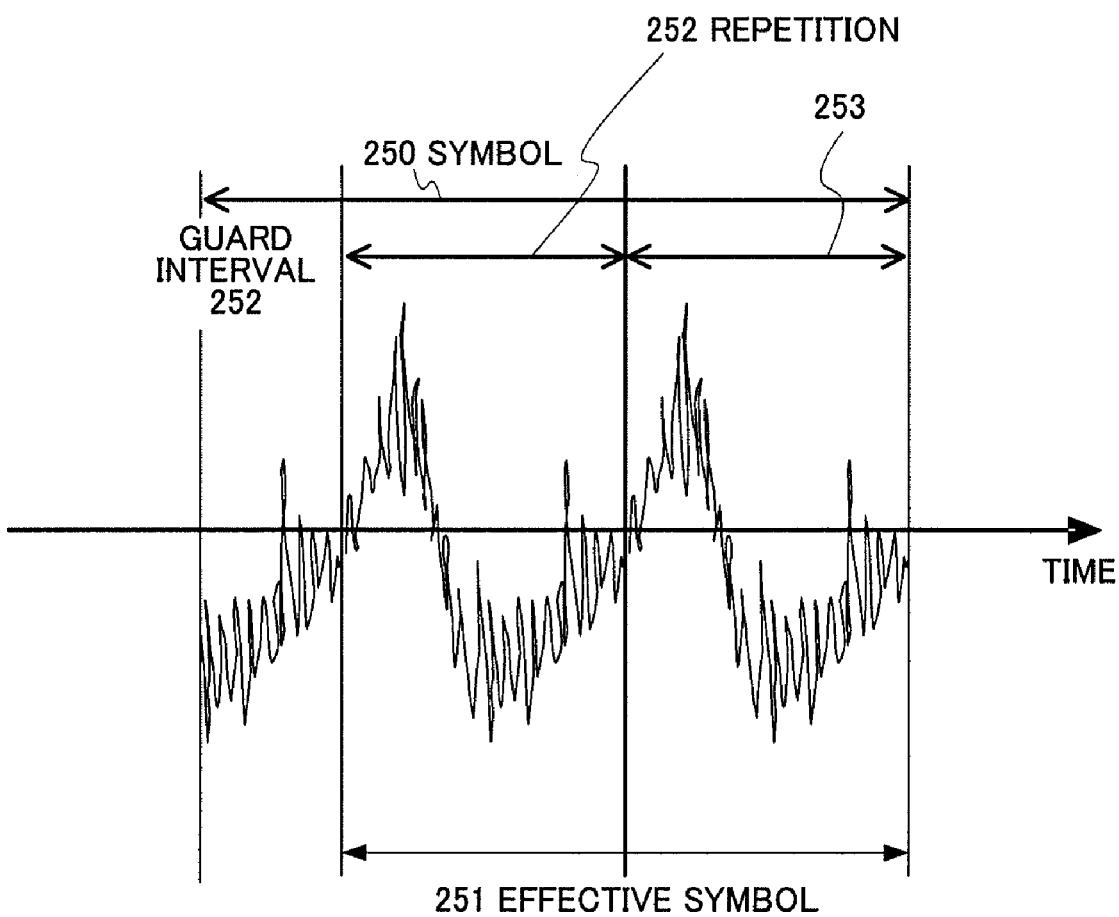
FIG. 6 is a drawing showing an example of the time waveform of a power measurement pilot of an even-numbered subcarrier of a communication terminal apparatus according to above Embodiment 1.

FIG. 6 is a drawing showing an example of the time waveform of an even-numbered subcarrier power measurement pilot, in which the time-axis waveform of an OFDM symbol using even-numbered frequencies is shown.

As shown in FIG. 6, in the time waveform of an even-numbered subcarrier power measurement pilot, one OFDM symbol 250 comprises an effective symbol 251, and a guard interval 252 in which the first part of effective symbol 251 is repeated, and furthermore in effective symbol 251, ½ effective symbol length signals 252 and 253 are repeated twice. That is to say, the entirety of an effective symbol of an OFDM symbol using even-numbered frequencies is a waveform in which a waveform of ½ the length of an effective symbol is repeated.

The present inventors took note of the fact that, with even-numbered subcarriers, a power measurement pilot ½ effective symbol length signal is repeated twice, and came up with the idea of detecting two repetitions of a power measurement pilot ½ effective symbol length signal and using this instead of a special timing detection signal.

In this embodiment, communication terminal apparatus 200 is equipped with an autocorrelator 220 (autocorrelator <2>) for outputting a frame synchronization signal in addition to an autocorrelator 210 (autocorrelator <1>) that outputs a symbol synchronization signal, and autocorrelator 220 (autocorrelator <2>) is equipped with a ½ effective symbol length delay circuit 221 that causes a ½ effective symbol length delay on a sampling clock basis, a complex conjugate section 222, a complex multiplication section 223, a (guard interval+½ effective symbol) length delay circuit 224 (delay circuit <2>) that causes a delay equivalent to a time period resulting from adding together a ½ effective symbol length and guard interval length on a sampling clock basis, an adder 225, and an averaging section 226, and obtains an autocorrelation result by averaging the results of addition by adder 225 by means of averaging section 226. This autocorrelation result becomes the original signal of two repetitions of the power measurement pilot ½ effective symbol length signal. Then frame timing can be detected by further performing in-phase averaging over predetermined frames (for example, several tens of frames) by means of in-phase averaging section 230.

Figure 7:
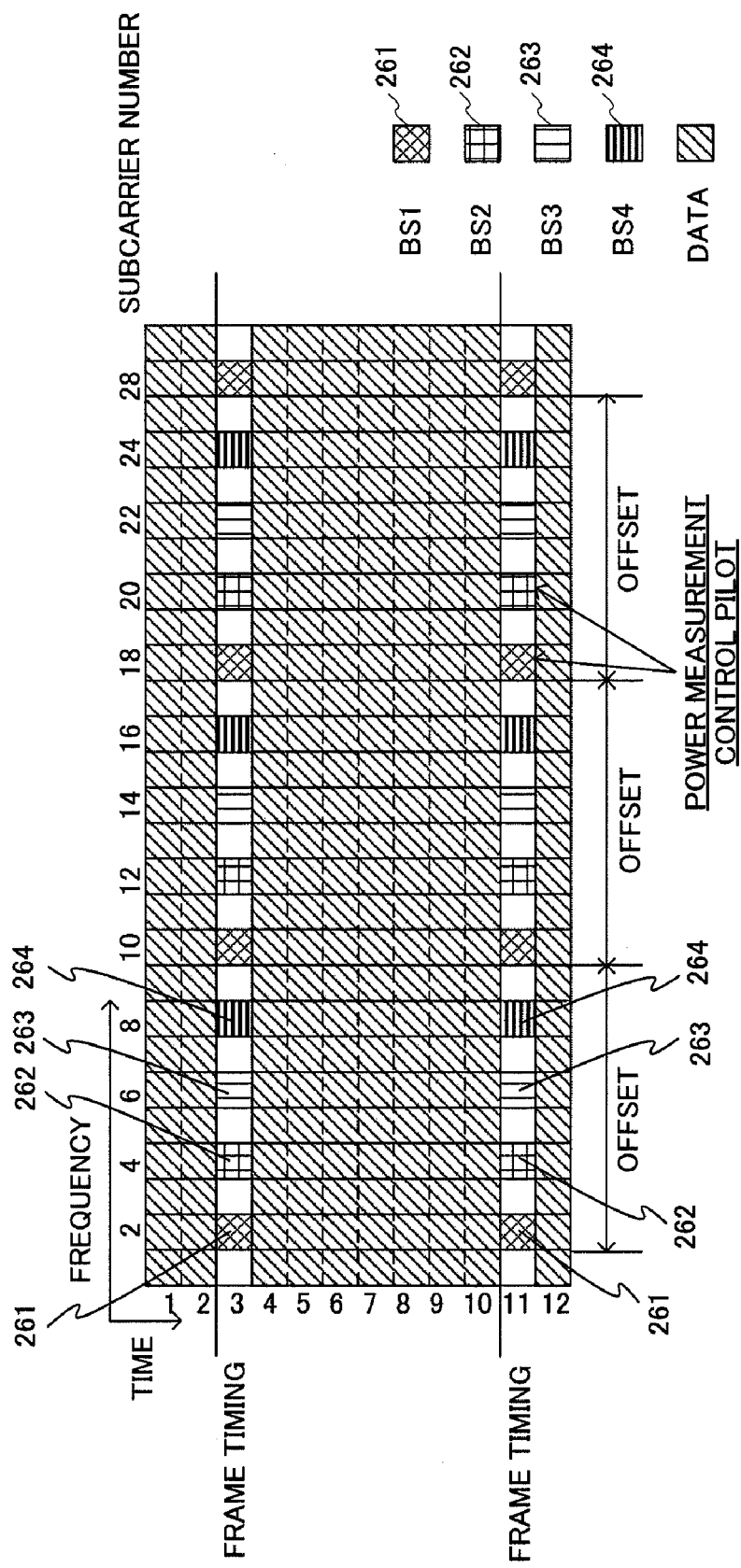
FIG. 7 is a drawing showing frequencies and frame timings of an OFDM system using even-numbered frequencies of a communication terminal apparatus according to above Embodiment 1.

FIG. 7 is a drawing showing frequencies and frame timings of an OFDM system using even-numbered frequencies. In FIG. 7, the vertical axis indicates time and the horizontal axis indicates frequency. To be more specific, time on the vertical axis is shown by frame timings 1, 2, ..., and frequency on the horizontal axis is shown by OFDM system subcarrier numbers 1, 2, .... Since this embodiment is an example of application in the case of even-numbered frequencies, even subcarrier numbers 2, 4, ..., 28 are shown.

Hatching in FIG. 7 indicates data, and numbers 261 through 264 and white spaces in FIG. 7 indicate power measurement pilots (hereinafter also referred to simply as "pilots") located at frame timings 3 and 11.

One symbol every fixed number of symbols is taken as frame timing 3 or 11, pilots are placed only at even-numbered frequencies at frame timings 3 and 11, and data communication symbols are placed at all frequencies at timings other than frame timings 3 and 11.

A first base station (BS1) is indicated by a first base station frequency number 261, and a pilot is placed at fixed intervals (here, every 8 subcarriers) among even-numbered frequencies, namely at frequencies 2, 10, 18, ....

Similarly, a second base station (BS2) is indicated by a second base station frequency number 262, and a pilot is placed at fixed intervals (every 8 subcarriers) among even-numbered frequencies, namely at frequencies 4, 12, 20, .... In the same way, a third base station (BS3) is indicated by a third base station frequency number 263, and a pilot is placed at fixed intervals (every 8 subcarriers) at even-numbered frequencies 6, 14, 22, ..., and a fourth base station (BS4) is indicated by a fourth base station frequency number 264, and a pilot is placed at fixed intervals (every 8 subcarriers) at even-numbered frequencies 8, 16, 24, ....

In this way, a structure is implemented whereby a pilot is placed at fixed frequency intervals for each base station only at frame timing even-numbered frequencies, and there are no data symbols at frame timings 3 and 11.

Figure 8:
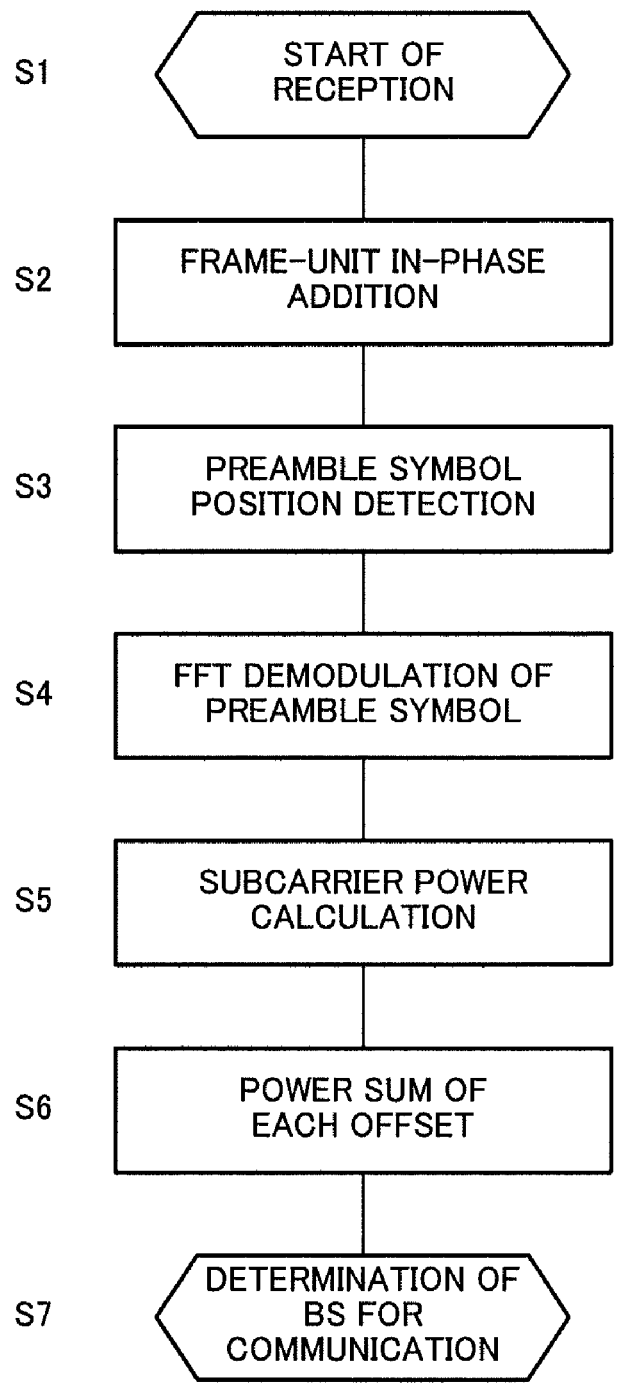

FIG. 8 is a flowchart showing processing that determines which base station a communication terminal apparatus in an OFDM system communicates with. In FIG. 8, "S" denotes a step of the processing flow.

This processing flow is initiated by the start of reception (step S1), and in step S2 in-phase averaging section 230 of communication terminal apparatus 200 performs frame-unit in-phase addition and detects frame timing, and outputs this to pilot power measurement circuit 240 as a frame synchronization signal. The following steps comprise a BS selection operation by pilot power measurement circuit 240. In step S3, a preamble symbol position is detected, and in step S4 the preamble symbol undergoes FFT demodulation. A preamble signal in which pilot signals of a plurality of base stations have been modulated at frame timing undergoes FFT demodulation.

Then, in step S5, subcarrier power calculation is performed, and in step S6 the power sum of each offset is calculated. In step S7, the base station (BS) to be communicated with is determined from the power sum of each offset, and this processing flow is terminated. Specifically, the power values of pilots of the same base station placed on each frequency of a particular offset are added, and communication is performed with the base station with the highest power. For example, in FIG. 7, the first through fourth base stations (BS1 through BS4) can be detected by finding the per-offset power sum of pilots placed at fixed intervals at frame timing even-numbered frequencies, and furthermore the base station (BS) to be communicated with can be determined by a comparison of the average power values of each base station (BS).

Figure 9:
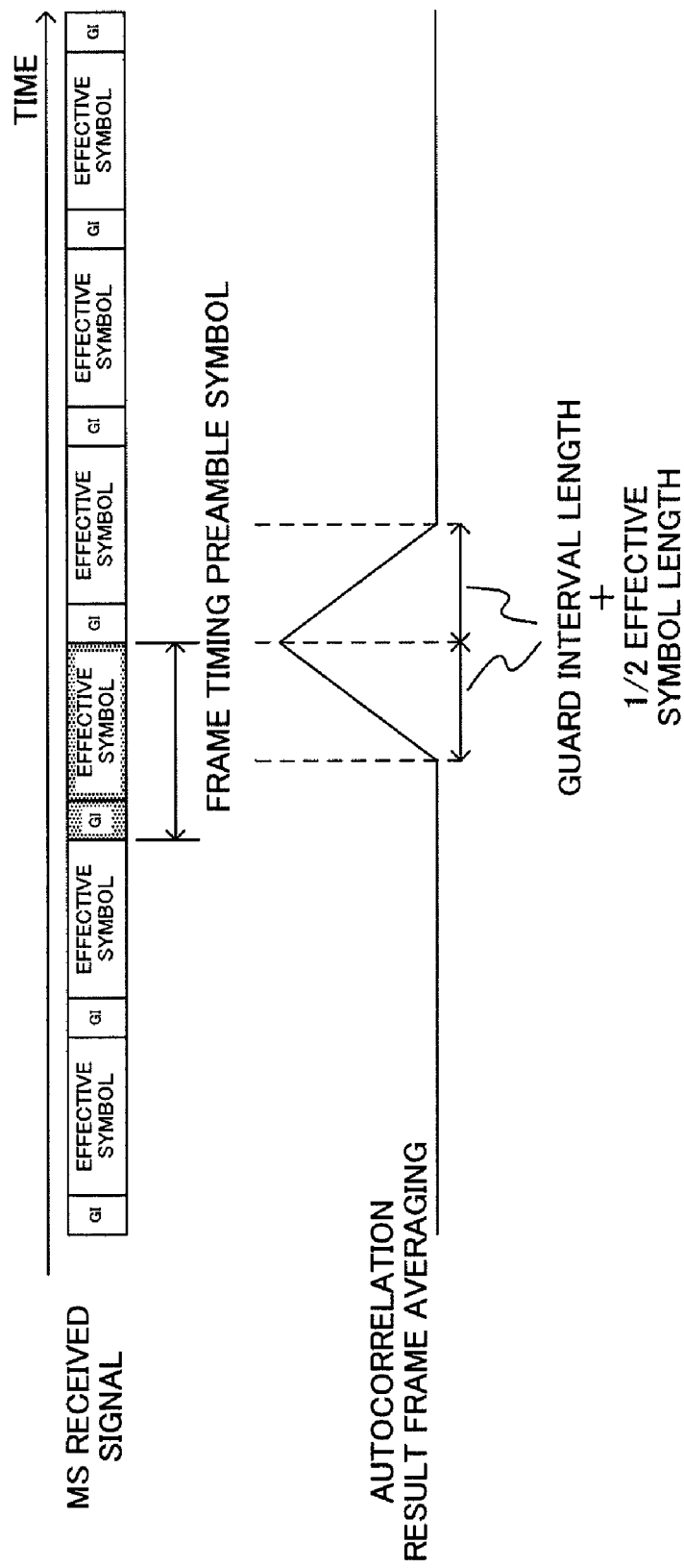
FIG. 9 is a drawing showing a waveform resulting from autocorrelation by an in-phase averaging section of a communication terminal apparatus according to above Embodiment 1.

FIG. 9 is a drawing showing a waveform resulting from autocorrelation by in-phase averaging section 230.

As shown in FIG. 9, if autocorrelation results input from autocorrelator 220 (autocorrelator <2>) are averaged over a plurality of frames, frame timing can be detected.

An averaged result is an isosceles triangle whose base length is twice the sum of ½ the effective symbol length and the guard interval length, and whose apex timing is frame timing. In in-phase averaging, an autocorrelator 220 (autocorrelator <2>) result further undergoes in-phase addition in phase units, the average thereof is found, and a frame synchronization signal is output. As shown in FIG. 9, as the number of in-phase additions increases, the real part shows a characteristic such that the peak of the triangular wave is gradually positioned in the latter half of the power measurement pilot time waveform. This characteristic enables the position of a power measurement pilot to be detected.

Operation will now be described in further detail with reference to FIG. 2 through FIG. 9.

[Transmission System]

On the OFDM transmitting apparatus 100 side, a power measurement pilot is provided as one OFDM symbol in one frame. Each BS is assigned beforehand a unique subcarrier number that can be used by a power measurement pilot. Subcarrier numbers are assigned as even numbers and as a plurality based on an offset determined according to the number of cell repetitions.

As a power measurement pilot subcarrier number, an even number is assigned to a particular base station (BS). Hitherto unassigned even numbers are assigned sequentially to other BSs.

It is assumed that BSs are mutually synchronized, and all BSs transmit a power measurement pilot at frame timing common to the BSs. Each BS is synchronized with other BSs, transmits one power measurement pilot symbol at frame timing, and transmits data symbols in other time areas.

For example, as shown in FIG. 7, power measurement pilots are placed at fixed intervals for each base station at frame timing 3 and 11 subcarrier number even-numbered frequencies of an OFDM system.

The power measurement pilots transmitted by each BS each have a different time waveform, but all form a signal in which an identical waveform is repeated within an effective symbol.

[Reception System]

On the communication terminal apparatus 200 side, an RF band frequency signal received by receiving antenna 201 is down-converted to a baseband frequency signal by RF section 202, undergoes A/D conversion by ADC 203, and is input as an FFT 205 input signal. FFT 205 obtains a received signal of each subcarrier by executing fast Fourier transform processing on the input signal. Per-subcarrier received signals obtained by FFT 205 have data distortion corrected by equalizer 206, and are output as receive data to a demodulator (not shown).

Meanwhile, an input signal that has undergone A/D conversion is input to autocorrelator 210 (autocorrelator <1>) and autocorrelator 220 (autocorrelator <2>). Autocorrelator 210 (autocorrelator <1>) extracts OFDM symbol timing and outputs an extracted symbol synchronization signal to S/P 204 and FFT 205.

A characteristic of this embodiment is the provision, in addition to autocorrelator 210 (autocorrelator <1>), of autocorrelator 220 (autocorrelator <2>) and in-phase averaging section 230 for outputting a frame synchronization signal, and pilot power measurement circuit 240 that performs subcarrier power calculation at frame timing, adds the power values of a pilot of the same base station arranged on each frequency of a plurality of offsets, and outputs a BS selection result for communicating with the base station with the highest power.

The time waveform of a power measurement pilot received by an MS (here, communication terminal apparatus 200) is of an unknown shape, but as regards the time waveform of a power measurement pilot of an even-numbered subcarrier, the same waveform having a cycle of ½ effective symbol length is repeated.

Therefore, as shown in FIG. 6, preamble symbols from a plurality of BSs received by an MS are repetitions of the same unknown waveform having a ½ effective symbol length cycle, and the positional frame timing of a power measurement pilot on the time axis can be identified from a characteristic resulting from in-phase averaging in frame units of an autocorrelation characteristic of the repeat waveform part. That is to say, by having an arrangement whereby an MS assigns even numbers to power measurement pilot subcarrier numbers among BSs beforehand, even though preamble symbols from a plurality of BSs are repetitions of unknown waveforms having a ½ effective symbol length cycle, the fact that the same waveform is repeated is itself information, and it is possible for a repetition of that same waveform to be treated in the same way as a known signal.

Pilot power measurement circuit 240 finds subcarrier power per BS from the result of FFT demodulation of a power measurement pilot at a frame synchronization signal power measurement pilot detection position. Furthermore, pilot power measurement circuit 240 finds the time-axis direction frame-unit average and selects a BS with a large result.

Figure 1:
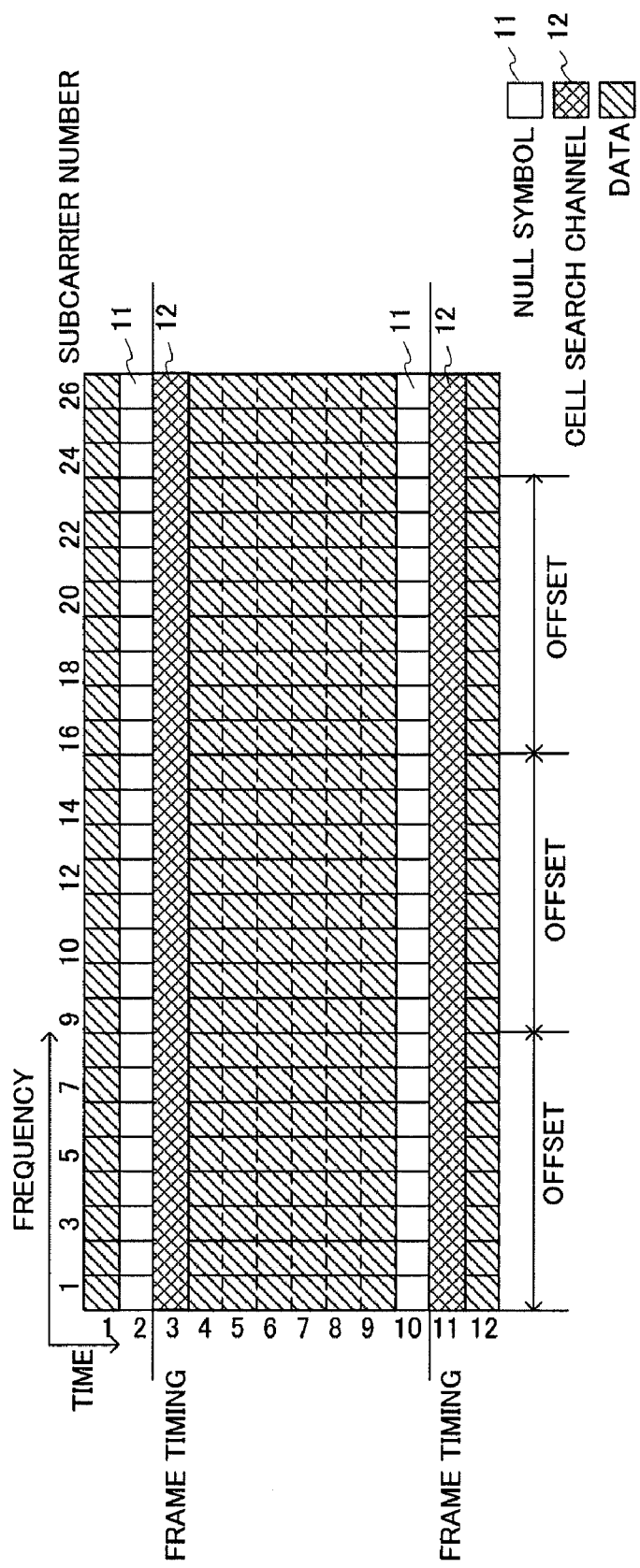
FIG. 1 is a drawing showing frequencies and a frame configuration of a conventional OFDM system.

As described in detail above, according to this embodiment, an OFDM transmitting apparatus 100 sets a power measurement pilot as one OFDM symbol in one frame, assigns power measurement pilot subcarrier numbers for each base station apparatus, and transmits a power measurement pilot according to common frame timing among base station apparatuses; and communication terminal apparatus 200 is equipped with autocorrelator 210 (autocorrelator <1>) that outputs a symbol synchronization signal, autocorrelator 220 (autocorrelator <2>) that finds an autocorrelation characteristic of a repeat waveform part that is a repetition of the same waveform having a cycle of ½ effective symbol length from a received power measurement pilot, and in-phase averaging section 230 that performs in-phase averaging in frame units of an autocorrelation characteristic of a repeat waveform part and detects the positional frame timing of a power measurement pilot on the time axis; and, since the positional frame timing of a power measurement pilot on the time axis is detected by finding an autocorrelation characteristic of an identical waveform having a cycle of ½ effective symbol length from a received power measurement pilot and performing in-phase averaging in frame units, a power measurement pilot can also be used as a timing detection symbol, it is possible to use only a one-symbol control channel area in one frame, and the data part transmission amount can be increased. For example, whereas there are a total of two OFDM symbols that are not communication data in one frame in the example of conventional technology shown in FIG. 1, with this embodiment it is possible to use only a one-symbol control channel area in one frame by making dual use of a power measurement pilot as a timing detection symbol, as shown in FIG. 7. As the data part can be increased by one symbol per frame, this is extremely effective in increasing the transmission amount.

Embodiment 2

The hardware configuration of an OFDM transmitting apparatus according to Embodiment 2 of the present invention is the same as that in FIG. 2, and therefore a description thereof is omitted here. However, a difference between Embodiment 1 and this embodiment is that, whereas an even number is assigned to each base station (BS) as a power measurement pilot subcarrier number in Embodiment 1, an odd number is assigned to each BS in this embodiment.

Figure 10:
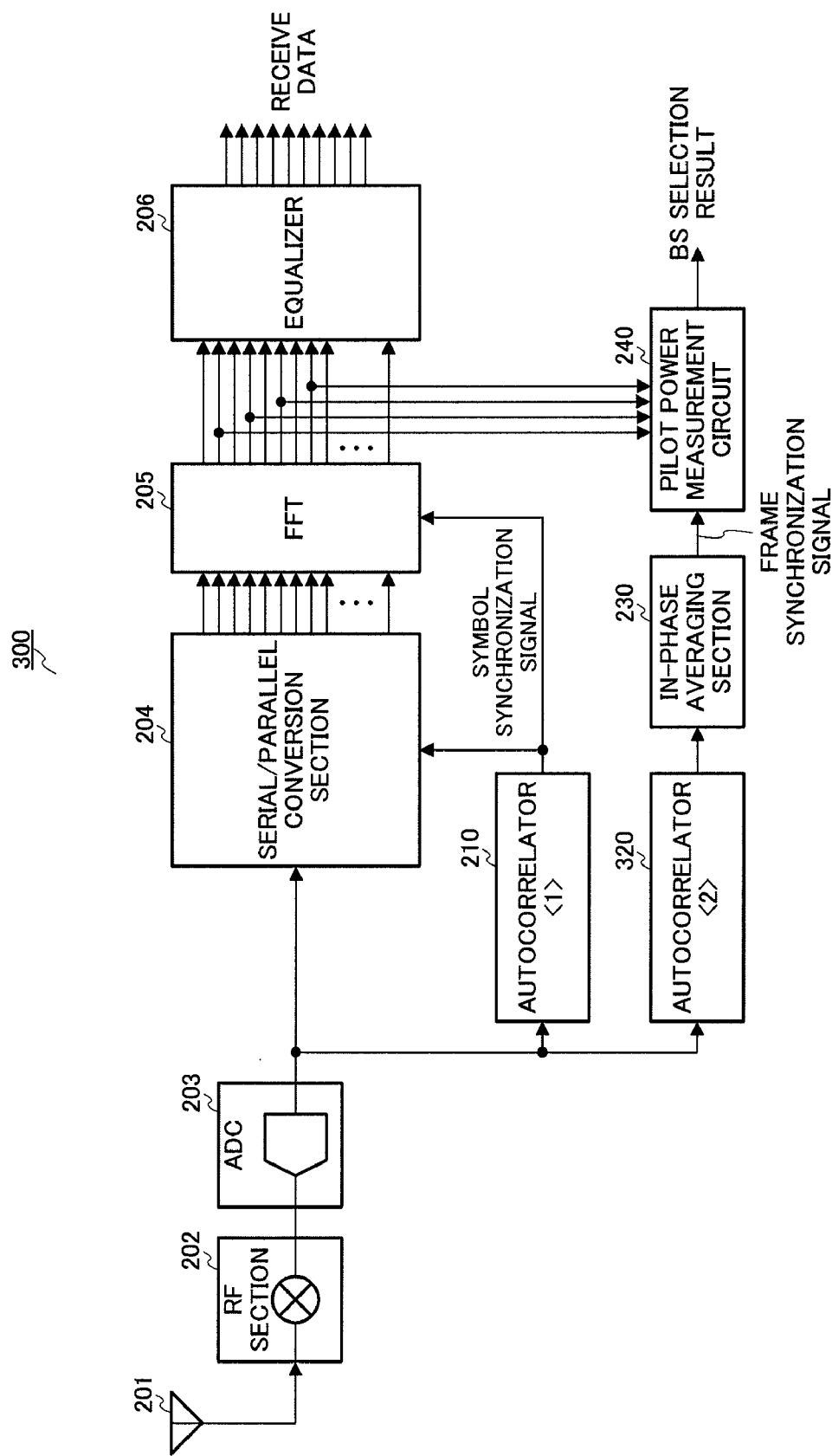
FIG. 10 is a block diagram showing the configuration of a communication terminal apparatus according to Embodiment 2 of the present invention.

FIG. 10 is a block diagram showing the configuration of a communication terminal apparatus that receives transmit data from an OFDM transmitting apparatus according to Embodiment 2 of the present invention. Configuration parts identical to those in FIG. 3 are assigned the same reference codes as in FIG. 3, and duplicate descriptions are omitted.

In FIG. 10, a communication terminal apparatus 300 is configured by means of a receiving antenna 201, an RF section 202, an A/D conversion section (ADC) 203, a serial/parallel conversion section (S/P) 204, a fast Fourier transform section (FFT) 205, an equalizer 206, an autocorrelator 210 (autocorrelator <1>), an autocorrelator 320 (autocorrelator <2>), an in-phase averaging section 230, and a pilot power measurement circuit 240.

Autocorrelator 210 (autocorrelator <1>) extracts OFDM symbol timing, and outputs an extracted symbol synchronization signal to serial/parallel conversion section (S/P) 204 and fast Fourier transform section (FFT) 205. The configuration of autocorrelator 210 (autocorrelator <1>) has been described in detail above with reference to FIG. 4. Autocorrelator 210 (autocorrelator <1>) has the same configuration in the case of odd-numbered frequencies as in this embodiment, and in the case of even-numbered frequencies as in above-described Embodiment 1. Autocorrelator 210 (autocorrelator <1>) finds autocorrelation for a guard interval part and effective symbol start part, enabling symbol timing to be detected.

Autocorrelator 320 (autocorrelator <2>) extracts frame timing from an OFDM signal, and outputs the extracted frame timing to in-phase averaging section 230. Autocorrelator 320 (autocorrelator <2>) has a function as an autocorrelation section that finds an autocorrelation characteristic of a repeat waveform part that is a repetition of a waveform with the sign reversed having a cycle of ½ effective symbol length from a received power measurement pilot. The configuration of autocorrelator 320 (autocorrelator <2>) will be described in detail later herein with reference to FIG. 11.

In-phase averaging section 230 can detect frame timing by performing averaging of autocorrelator 320 (autocorrelator <2>) autocorrelation results over a plurality of frames. The detected frame timing is input to pilot power measurement circuit 240 as a frame synchronization signal. In-phase averaging section 230 frame-unit in-phase addition has been described above with reference to the flowchart in FIG. 8 and the waveform diagram in FIG. 9.

Pilot power measurement circuit 240 extracts pilot data from FFT 205 output together with a frame synchronization signal, and measures the power of the respective pilot signals.

In particular, pilot power measurement circuit 240 performs subcarrier power calculation based on the result of FFT demodulation of a preamble signal in which pilot signals of a plurality of base stations are modulated at frame timing, adds the power values of a pilot of the same base station arranged on each frequency of a plurality of offsets, and outputs a BS selection result for communicating with the base station with the highest power.

Figure 11:
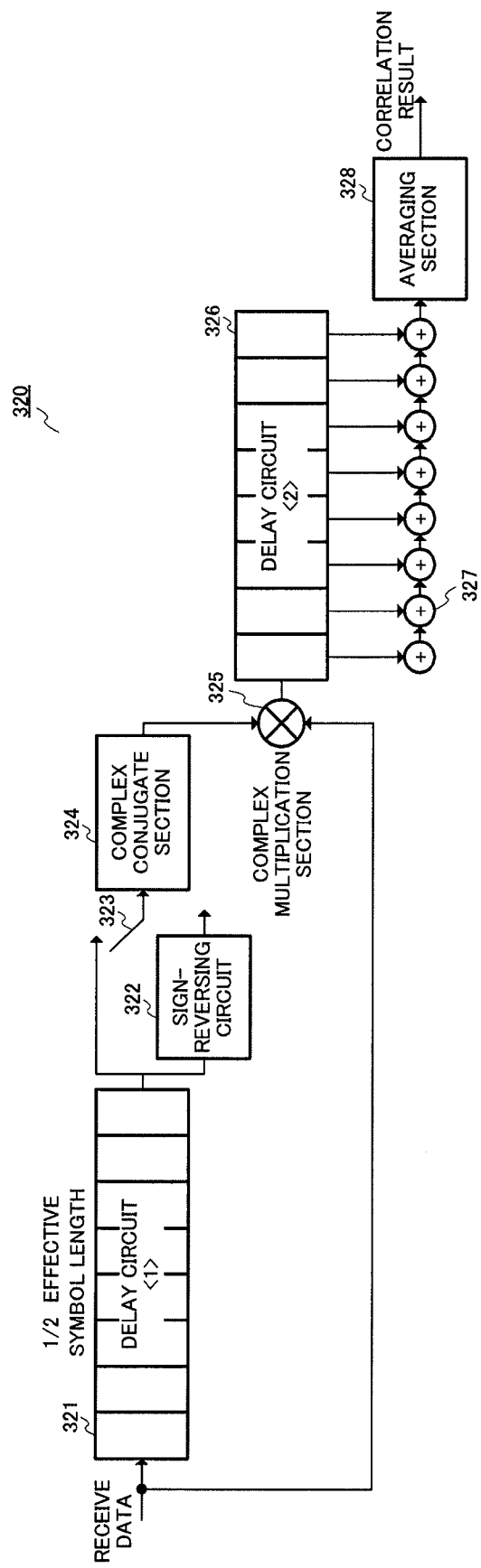
FIG. 11 is a circuit diagram showing the detailed configuration of an autocorrelator of a communication terminal apparatus according to above Embodiment 2.

FIG. 11 is a circuit diagram showing the detailed configuration of autocorrelator 320 (autocorrelator <2>). This embodiment shows an autocorrelator <2> for odd-numbered frequencies.

In FIG. 11, autocorrelator 320 (autocorrelator <2>) is configured by means of a ½ effective symbol length delay circuit 321 (delay circuit <1>), a sign-reversing circuit 322, a selector 323, a complex conjugate section 324, a complex multiplication section 325, a (guard interval+½ effective symbol) length delay circuit 326 (delay circuit <2>), an adder 327, and an averaging section 328.

½ effective symbol length delay circuit 321 (delay circuit <1>) comprises a shift register that causes a ½ effective symbol length delay on a sampling clock basis.

The sampling clock frequency of ADC 203 is determined beforehand. The length of one OFDM symbol is made up of (1) an effective symbol and (2) a guard interval. An OFDM signal in which only odd-numbered frequencies undergo inverse Fourier transform processing is a signal in which the same waveform is repeated with the sign reversed. As a ½ effective symbol length signal is repeated twice, a waveform delayed by ½ effective symbol length by ½ effective symbol length delay circuit 321, and a waveform delayed by ½ effective symbol length and having had its sign reversed by sign-reversing circuit 322, are passed to complex multiplication section 325 via selector 323.

Complex conjugate section 324 finds the delayed signal complex conjugate in order for complex multiplication between a delayed waveform and non-delayed waveform to be performed by complex multiplication section 325.

Complex multiplication section 325 performs complex multiplication of the delayed waveform and non-delayed waveform.

(Guard interval+½ effective symbol) length delay circuit 326 (delay circuit <2>) comprises a shift register that causes a delay equivalent to a time period resulting from adding together a ½ effective symbol length and guard interval length on a sampling clock basis.

Adder 327 adds all the sampling clock unit delay results of (guard interval+½ effective symbol) length delay circuit 326 (delay circuit <2>), and the addition result becomes an autocorrelation value.

Averaging section 328 divides the autocorrelation value by a number resulting from adding together (1) the number of ADC sampling points equivalent to a guard interval and (2) the number of ADC sampling points equivalent to ½ effective symbol length. Averaging section 328 is used to reduce the number of columns of the addition result.

For both the above-described ½ effective symbol length delay circuit 321 (delay circuit <1>) one-stage shift register and the above-described (guard interval+½ effective symbol) length delay circuit 326 (delay circuit <2>) one-stage shift register, only the number of bits of ADC 203 need to be secured. Here, since the columns of the addition result increase, the number of columns is suppressed by averaging section 328.

The operation of a communication terminal apparatus configured as described above will now be explained.

Figure 12:
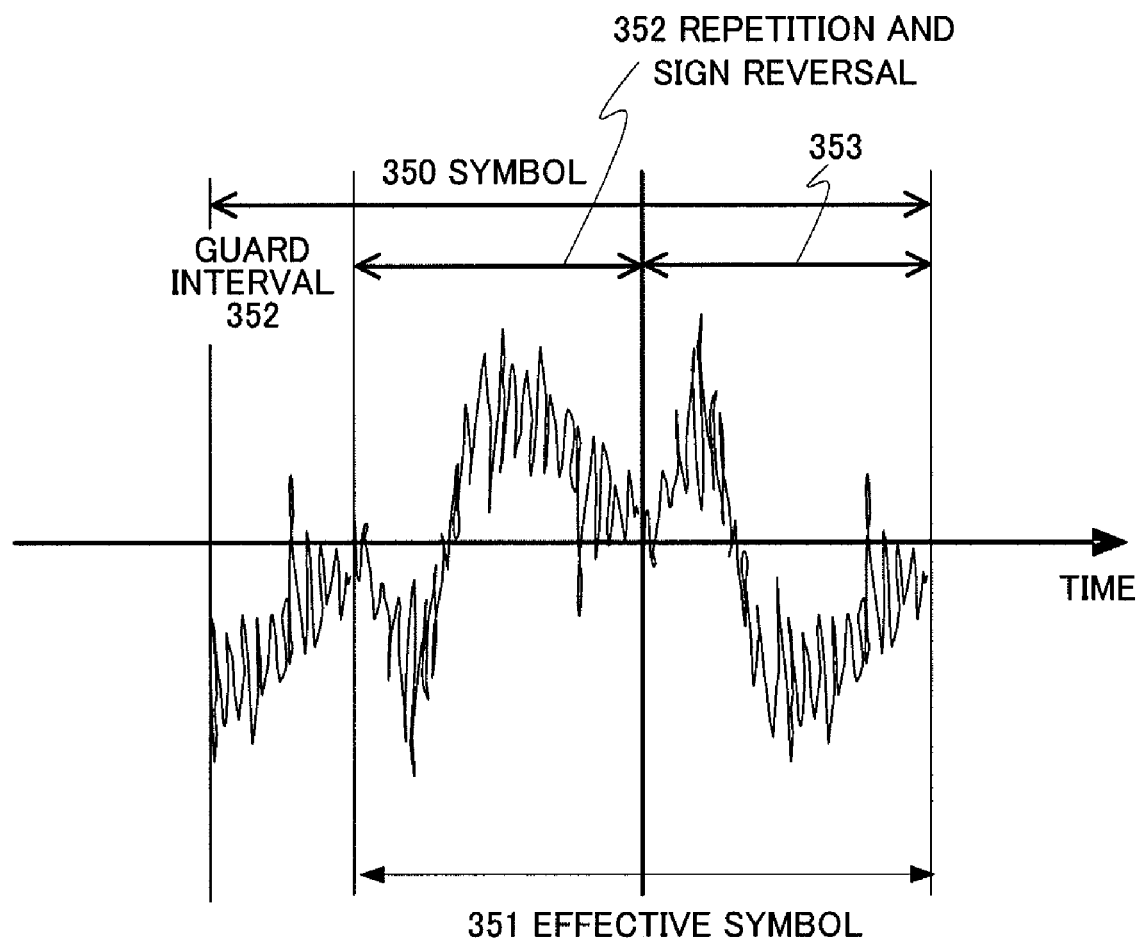
FIG. 12 is a drawing showing an example of the time waveform of a power measurement pilot of an odd-numbered subcarrier of a communication terminal apparatus according to above Embodiment 2.

FIG. 12 is a drawing showing an example of the time waveform of an odd-numbered subcarrier power measurement pilot, in which the time-axis waveform of an OFDM symbol using odd-numbered frequencies is shown.

As shown in FIG. 12, in the time waveform of an odd-numbered subcarrier power measurement pilot, one OFDM symbol 350 comprises an effective symbol 351, and a guard interval 352 in which the first part of effective symbol 351 is repeated, and effective symbol 251 further comprises signals 352 and 353 with waveforms in which a ½ effective symbol length waveform is repeated and has its sign reversed. That is to say, the entirety of an effective symbol of an OFDM symbol using odd-numbered frequencies is a waveform in which the same waveform of ½ the length of an effective symbol is repeated with its sign reversed.

In this embodiment, communication terminal apparatus 300 is equipped with an autocorrelator 320 (autocorrelator <2>) for outputting a frame synchronization signal in addition to an autocorrelator 210 (autocorrelator <1>) that outputs a symbol synchronization signal, and autocorrelator 320 (autocorrelator <2>) is equipped with a ½ effective symbol length delay circuit 221 that causes a ½ effective symbol length delay on a sampling clock basis, a sign-reversing circuit 322 that reverses the sign of a waveform, a selector 323 that selects a waveform after sign reversal, a complex conjugate section 324, a complex multiplication section 325, a (guard interval+½ effective symbol) length delay circuit 326 (delay circuit <2>) that causes a delay equivalent to a time period resulting from adding together a ½ effective symbol length and guard interval length on a sampling clock basis, an adder 327, and an averaging section 328, and obtains an autocorrelation result by averaging the results of addition by adder 327 by means of averaging section 328. This autocorrelation result becomes the original signal of two repetitions of the power measurement pilot ½ effective symbol length signal. Then frame timing can be detected by further performing in-phase averaging over predetermined frames (for example, several tens of frames) by means of in-phase averaging section 230.

Figure 13:
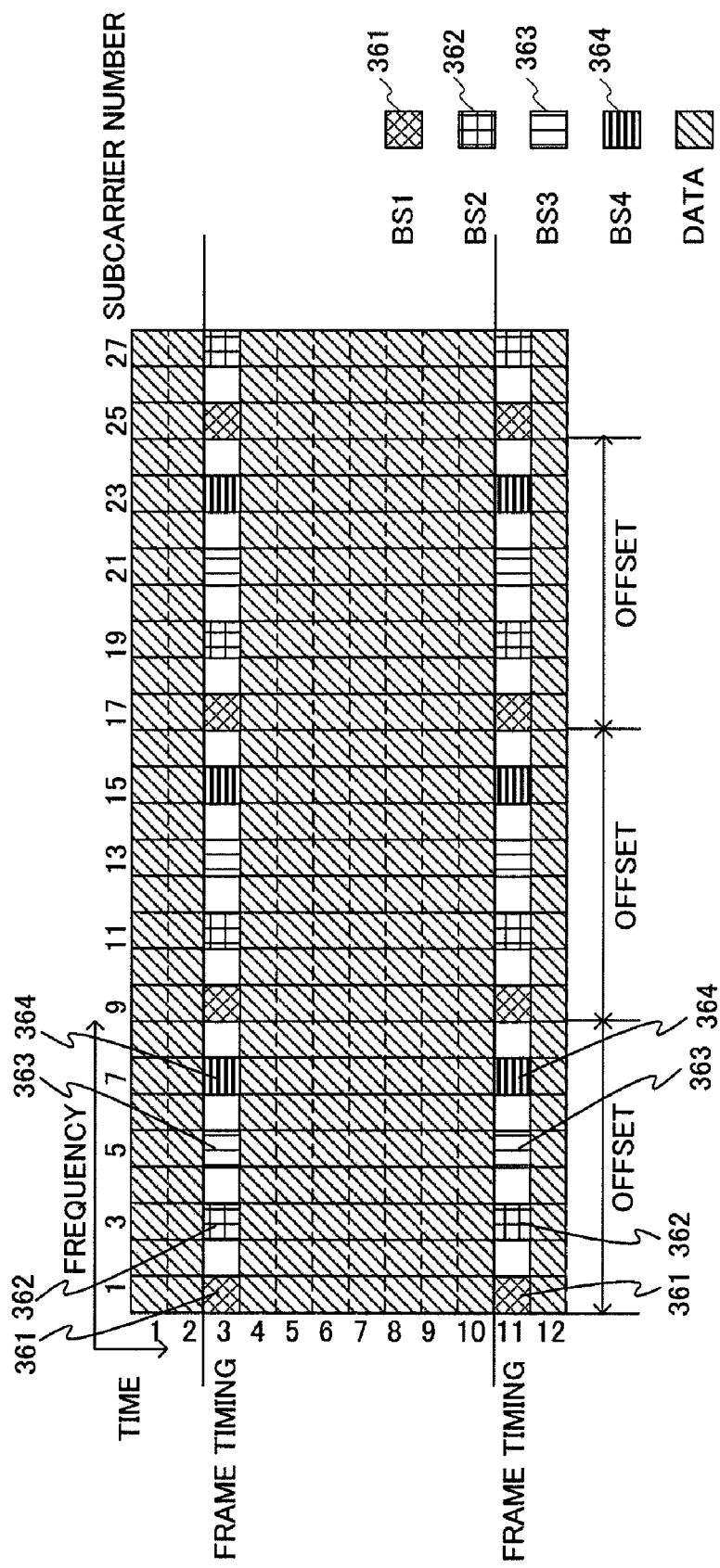
FIG. 13 is a drawing showing frequencies and frame timings of an OFDM system using odd-numbered frequencies of a communication terminal apparatus according to above Embodiment 2.

FIG. 13 is a drawing showing frequencies and frame timings of an OFDM system using odd-numbered frequencies. In FIG. 13, the vertical axis indicates time and the horizontal axis indicates frequency. To be more specific, time on the vertical axis is shown by frame timings 1, 2, . . . , and frequency on the horizontal axis is shown by OFDM system subcarrier numbers 1, 2, . . . . Since this embodiment is an example of application in the case of odd-numbered frequencies, odd subcarrier numbers 1, 3, . . . , 27 are shown.

Hatching in FIG. 13 indicates data, and numbers 361 through 364 and white spaces in FIG. 13 indicate power measurement pilots (hereinafter also referred to simply as "pilots") located at frame timings 3 and 11.

One symbol every fixed number of symbols is taken as frame timing 3 or 11, pilots are placed only at odd-numbered frequencies at frame timings 3 and 11, and data communication symbols are placed at all frequencies at timings other than frame timings 3 and 11.

A first base station (BS1) is indicated by a first base station frequency number 361, and a pilot is placed at fixed intervals (here, every 8 subcarriers) among odd-numbered frequencies, namely at frequencies 1, 9, 17, . . . .

Similarly, a second base station (BS2) is indicated by a second base station frequency number 362, and a pilot is placed at fixed intervals (every 8 subcarriers) among odd-numbered frequencies, namely at frequencies 3, 11, 19, . . . . In the same way, a third base station (BS3) is indicated by a third base station frequency number 363, and a pilot is placed at fixed intervals (every 8 subcarriers) at odd-numbered frequencies 5, 13, 21, . . . , and a fourth base station (BS4) is indicated by a fourth base station frequency number 364, and a pilot is placed at fixed intervals (every 8 subcarriers) at odd-numbered frequencies 7, 15, 23, . . . .

In this way, a structure is implemented whereby a pilot is placed at fixed frequency intervals for each base station only at frame timing 3 and 11 odd-numbered frequencies, and there are no data symbols at frame timings 3 and 11.

Processing that determines which base station communication terminal apparatus 300 of this embodiment communicates with is the same as that shown in FIG. 8, and therefore a description thereof is omitted here. However, in step S6 in FIG. 8, the first through fourth base stations (BS1 through BS4) are detected by finding the per-offset power sum of pilots placed at fixed intervals at frame timing 3 and 11 odd-numbered frequencies, and in step S7 the base station (BS) to be communicated with is determined by a comparison of the average power values of each base station (BS). Also, the waveform resulting from autocorrelation by in-phase averaging section 230 in FIG. 10 is virtually identical to that in FIG. 9, and therefore a description thereof is omitted here. In-phase averaging section 230 can detect frame timing by performing averaging of autocorrelation results input from autocorrelator 320 (autocorrelator <2>) autocorrelation results over a plurality of frames.

Operation will now be described in further detail.

[Transmission System]

On the OFDM transmitting apparatus 100 side, a power measurement pilot is provided as one OFDM symbol in one frame. Each BS is assigned beforehand a unique subcarrier number that can be used by a power measurement pilot. Subcarrier numbers are assigned as odd numbers and as a plurality based on an offset determined according to the number of cell repetitions.

As a power measurement pilot subcarrier number, an odd number is assigned to a particular base station (BS). Hitherto unassigned odd numbers are assigned sequentially to other BSs.

It is assumed that BSs are mutually synchronized, and all BSs transmit a power measurement pilot at frame timing common to the BSs. Each BS is synchronized with other BSs, transmits one power measurement pilot symbol at frame timing, and transmits data symbols in other time areas.

For example, as shown in FIG. 13, power measurement pilots are placed at fixed intervals for each base station at frame timing 3 and 11 subcarrier number odd-numbered frequencies of an OFDM system.

The power measurement pilots transmitted by each BS each have a different time waveform, but all form a signal in which an identical waveform is repeated with its sign reversed within an effective symbol.

[Reception System]

On the communication terminal apparatus 300 side, an RF band frequency signal received by receiving antenna 201 is down-converted to a baseband frequency signal by RF section 202, undergoes A/D conversion by ADC 203, and is input as an FFT 205 input signal. FFT 205 obtains a received signal of each subcarrier by executing fast Fourier transform processing on the input signal. Per-subcarrier received signals obtained by FFT 205 have data distortion corrected by equalizer 206, and are output as receive data to a demodulator (not shown).

Meanwhile, an input signal that has undergone A/D conversion is input to autocorrelator 210 (autocorrelator <1>) and autocorrelator 320 (autocorrelator <2>). Autocorrelator 210 (autocorrelator <1>) extracts OFDM symbol timing and outputs an extracted symbol synchronization signal to S/P 204 and FFT 205.

A characteristic of this embodiment is the provision, in addition to autocorrelator 210 (autocorrelator <1>), of autocorrelator 320 (autocorrelator <2>) and in-phase averaging section 230 for outputting a frame synchronization signal, and pilot power measurement circuit 240 that performs subcarrier power calculation at frame timing, adds the power values of a pilot of the same base station arranged on each frequency of a plurality of offsets, and outputs a BS selection result for communicating with the base station with the highest power.

The time waveform of a power measurement pilot received by an MS (here, communication terminal apparatus 300) is of an unknown shape, but as regards the time waveform of a power measurement pilot of an odd-numbered subcarrier, the same waveform having a cycle of ½ effective symbol length is repeated with its sign reversed. Consequently, autocorrelator 320 (autocorrelator <2>) is equipped with a sign-reversing circuit 322 that reverses the sign, and a selector 323 for passing a reversed signal to complex multiplication section 325 at predetermined timing. Other operations are the same as in the case of even-numbered subcarriers in Embodiment 1.

Therefore, as shown in FIG. 12, preamble symbols from a plurality of BSs received by an MS are repetitions of waveforms in which the same unknown waveform having a ½ effective symbol length cycle is repeated with the sign reversed. By having an arrangement whereby an MS assigns odd numbers to power measurement pilot subcarrier numbers among BSs beforehand, even though preamble symbols from a plurality of BSs are repetitions of the same unknown waveform having a ½ effective symbol length cycle with the sign reversed, the fact that the same waveform is repeated is itself information, and it is possible for a repetition of that same waveform to be treated in the same way as a known signal.

Then in-phase averaging section 230 can identify the positional frame timing of a power measurement pilot on the time axis from a characteristic resulting from in-phase averaging in frame units of an autocorrelation characteristic of the repeat waveform part.

Pilot power measurement circuit 240 finds subcarrier power per BS from the result of FFT demodulation of a power measurement pilot at a frame synchronization signal power measurement pilot detection position. Furthermore, pilot power measurement circuit 240 finds the time-axis direction frame-unit average and selects a BS with a large result.

Thus, according to this embodiment, communication terminal apparatus 300 is equipped with autocorrelator 320 (autocorrelator <2>) that finds an autocorrelation characteristic of a repeat waveform part that is a repetition of the same waveform having a cycle of ½ effective symbol length with the sign reversed from a received power measurement pilot, and performs the same kind of processing as in Embodiment 1 for odd numbers, making it possible to obtain the same kind of effect as in the case of Embodiment 1—that is, enabling the data part to be increased by one symbol per frame by making dual use of a power measurement pilot as a timing detection symbol, and enabling the transmission amount to be increased.

Embodiment 3

This embodiment is an example of the assignment of subcarrier numbers assigned to each BS in an OFDM system according to Embodiment 1.

The subcarrier number assignment method of this embodiment has the following steps.

(1) The amplitude of a power measurement pilot transmitted by each BS is taken to be fixed.

(2) As power measurement pilot subcarrier numbers, a plurality of even numbers offset by a specific number are assigned to a particular BS. A plurality of hitherto unassigned even numbers, offset by a specific number, are assigned sequentially to other BSs. The above-mentioned specific offset number is determined based on the number of cell repetitions in a multi-cell environment.

(3) An MS finds the power of each subcarrier complex signal after FFT processing of a received power measurement pilot, adds the power values of a plurality of subcarriers separated by the above-described offset, and finds an average in frame units. A BS with high power is found, and a BS with low transmission loss and low communication loss is determined.

FIG. 14 is a drawing showing numbers of cell repetitions of an OFDM system according to Embodiment 3 of the present invention. FIGS. 14A, 14B, and 14C show examples of subcarrier number allocation for cell numbers of 7, 19, and 37 respectively.

For example, when the number of cell repetitions is 37 and the FFT size is 1024, the offset amount (see "OFFSET" in FIG. 7) is taken to be 74 (>37×2).

FIG. 15 is a drawing showing an example of subcarrier assignment of each BS in the above case. This figure shows the relationship of subcarrier intervals at which base station pilots are placed.

In FIG. 14 and FIG. 15, assignment is possible for BS1 to BS37, and the amplitude of a power measurement pilot transmitted by each BS is taken to be fixed.

As power measurement pilot subcarrier numbers, a plurality of even numbers offset by a specific number are assigned to a particular BS. For example, BS1 is assigned even subcarrier number 2, then subcarrier number 76 offset by specific number 74, followed by subcarrier number 150 offset by specific number 74, and so on up to subcarrier number 890.

A plurality of hitherto unassigned even numbers, offset by the above specific number, are assigned sequentially to BS2 through BS37. In this example, BS2 is assigned even subcarrier number 4, then even subcarrier number 78 offset by specific number 74, followed by subcarrier number 152 offset by specific number 74, and so on up to subcarrier number 892. Similarly, BS3 is assigned even subcarrier number 6, then even subcarrier number 80 offset by specific number 74, followed by subcarrier number 154 offset by specific number 74, and so on up to subcarrier number 894, and BS37 is assigned even subcarrier number 74, then even subcarrier number 148 offset by specific number 74, followed by subcarrier number 222 offset by specific number 74, and so on up to subcarrier number 962. Since this is a case in which the number of cell repetitions is 37 and the FFT size is 1024, BS37's even subcarrier number 962 is the last subcarrier number.

Thus, according to this embodiment, a predetermined interval at which a particular BS is used is determined by an offset, and therefore the BS that should be communicated with can be determined by the total received power of a plurality of subcarriers for which there is a fixed offset, there is resistance to frequency selective fading, and a BS with low transmission loss that is suitable for communication can be selected.

This embodiment is an example of application to an example of subcarrier number assignment in which a plurality of even numbers are assigned to each BS, but application is also possible in the same way to an example of subcarrier number assignment in which a plurality of odd numbers are assigned to each BS in an OFDM system according to Embodiment 2.

Embodiment 4

This embodiment is an example of subcarrier number assignment in which, in addition to the procedure in Embodiment 3, subcarrier numbers assigned to each BS hop according to a certain rule.

The subcarrier number assignment method of this embodiment has the following steps.

(1) Subcarrier numbers assigned to a BS are cycled on a frame-by-frame basis.

(2) The cycling rule is also known to an MS, and an MS calculates the sum of per-offset pilot power in accordance with the cycling rule, and communicates with a BS with a large power sum. That is to say, an MS finds the average total pilot power of a specific BS over a plurality of frames according to the rule, and determines a BS with low communication loss.

Figure 17:
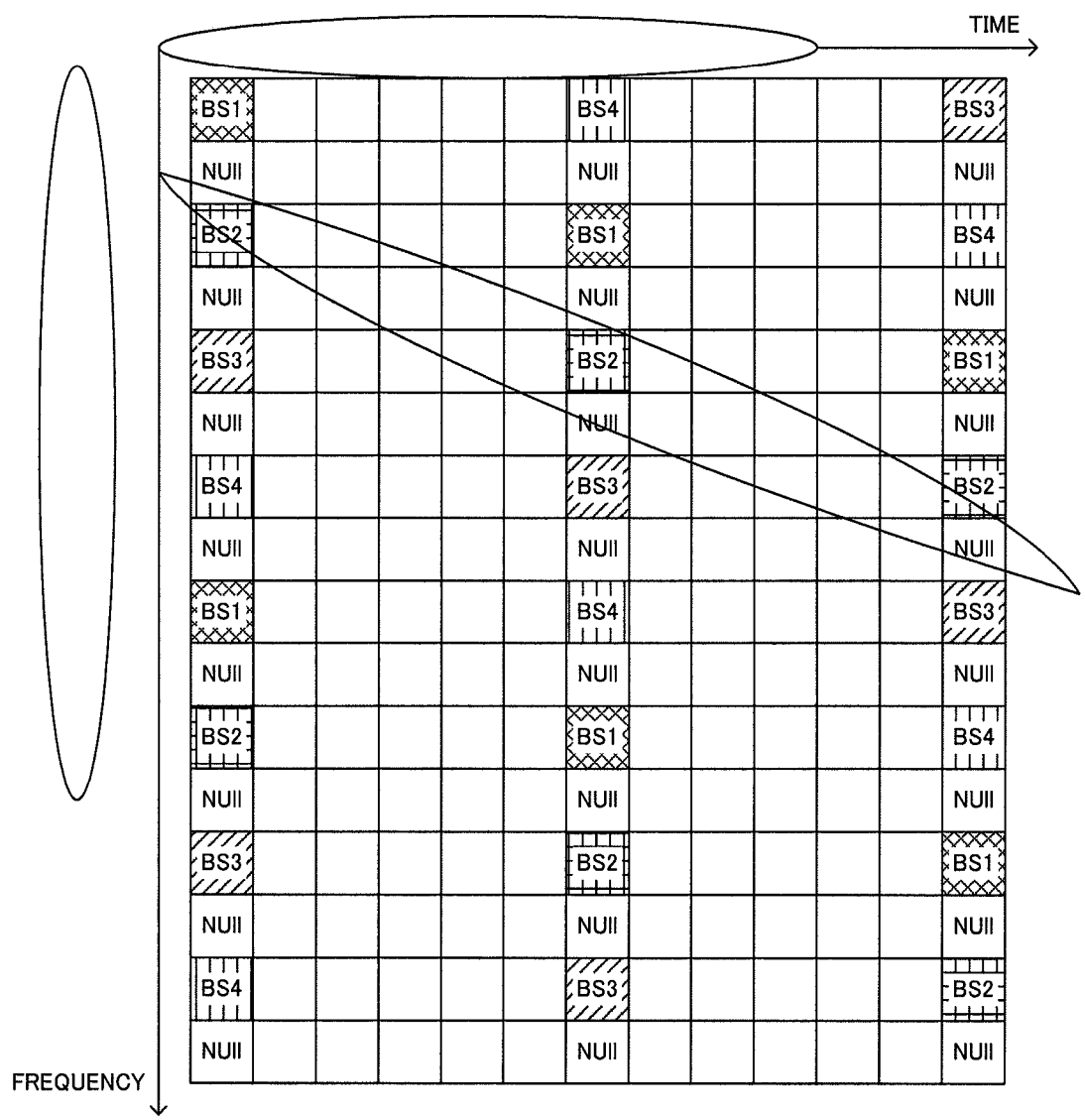
FIG. 17 is a drawing showing schematically the relationship between numbers of cell repetitions of an OFDM system according to above Embodiment 4 and intervals of subcarriers on which a base station pilot is placed.

FIG. 16 is a drawing showing the relationship between numbers of cell repetitions and intervals of subcarriers on which a base station pilot is placed, and FIG. 17 is a drawing showing schematically the relationship between numbers of cell repetitions and intervals of subcarriers on which a base station pilot is placed.

Subcarrier numbers assigned to each BS hop according to a certain rule. For example, as shown in FIG. 16 and FIG. 17, subcarrier numbers assigned to a BS are cycled on a frame-by-frame basis. To consider BS1, in frame N, BS1 is assigned even subcarrier number 2, then subcarrier number 76 offset by specific number 74, followed by subcarrier number 150 offset by specific number 74, and so on up to subcarrier number 890. In this embodiment, in addition to the above, subcarrier numbers assigned to each BS are made to hop by cycling the subcarrier numbers assigned to each BS on a frame-by-frame basis. As shown in FIG. 17, through time-direction hopping, in frame N+1, BS1 is assigned even subcarrier number 74, then even subcarrier number 148 offset by specific number 74, followed by subcarrier number 222 offset by specific number 74, and so on up to subcarrier number 962.

Thus, according to this embodiment, a BS to be communicated with is determined by finding the total pilot power over a plurality of subcarriers that are made to hop in the time direction, and therefore resistance to frequency selective fading is further increased, and a base station apparatus with low transmission loss that is suitable for communication can be selected by also finding an average in the time-axis direction.

In this embodiment, hopping is performed whereby subcarrier numbers assigned to a base station apparatus are cycled, but any kind of hopping may be used, and, for example, a BS and MS may hold prearranged hops as table values.

Also, this embodiment is an example of application to an example of subcarrier number assignment in which a plurality of even numbers are assigned to each base station apparatus, but application is also possible in the same way to an example of subcarrier number assignment in which a plurality of odd numbers are assigned to each BS in an OFDM system according to Embodiment 2.

Embodiment 5

This embodiment is an example of the assignment of subcarrier numbers of a power measurement pilot transmitted by each BS.

The frame timing detection method of this embodiment has the following steps.

(1) As subcarrier numbers of a power measurement pilot transmitted by each BS, a plurality of even numbers or a plurality of odd numbers are assigned.

(2) The amplitude of a power measurement pilot transmitted by each BS is taken to be fixed.

(3) It is assumed that BSs are mutually synchronized, and all BSs transmit a power measurement pilot at frame timing common to the BSs.

Figure 18A:
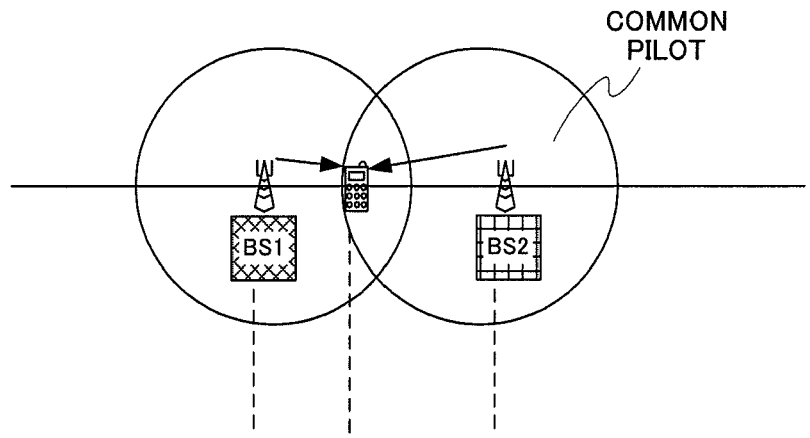
FIG. 18 is a drawing showing the relationship between a position relative to a BS of an OFDM system according to Embodiment 5 of the present invention and pilot received power.
Figure 18B:
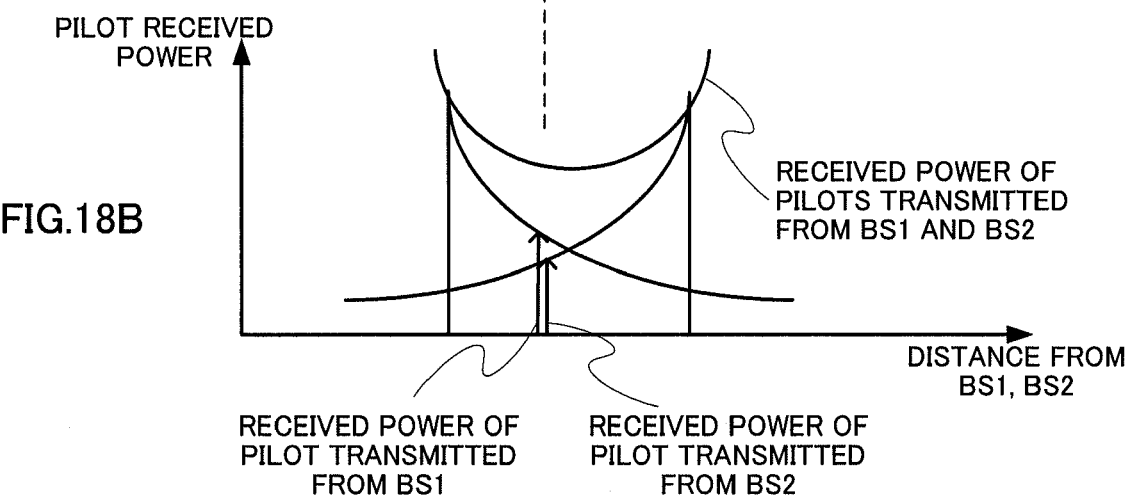

FIG. 18 is a drawing showing the relationship between a position relative to a BS and pilot received power. FIG. 18A shows positions relative to a BS and the disposition of received power, and FIG. 18B shows pilot received power for the positional relationship in FIG. 18A.

As shown in FIG. 18(b), the received power of a pilot transmitted from BS1 and the received power of a pilot transmitted from BS2 increase or decrease according to the distance from BS1 and BS2. A mobile station (MS) at the position shown in FIG. 18(a) detects frame timing using the power of both the pilot of a base station not eventually communicated with and the pilot of a base station eventually communicated with.

When a power measurement pilot transmitted from a particular BS is received by an MS, the field strength of that power measurement pilot is inversely proportional to between the square and fourth power of the distance from the MS.

Figure 19:
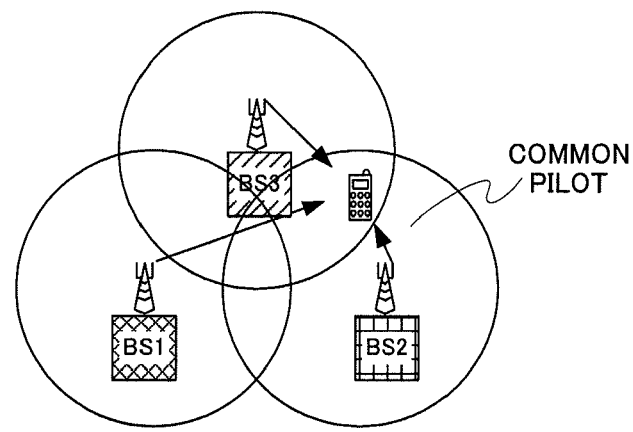
FIG. 19 is a conceptual diagram showing the application of a cell system according to above Embodiment 5 to an OFDM system.

FIG. 19 is a conceptual diagram showing the application of a cell system to an OFDM system.

A necessary MS operation is to extract a pilot part from a situation in which a data part and pilot part cannot be differentiated, but since power measurement pilots transmitted from a plurality of BSs can be used as pilots even though the signal is not only a power measurement pilot from a particular BS but a signal in which there is overlapping with power measurement pilots from other adjacent BSs, efficiency is good in terms of differentiating a data part from a pilot part.

The above descriptions are illustrations of preferred embodiments of the present invention, and the scope of the present invention is not limited to these.

In the above embodiments, the terms "base station apparatus," "communication terminal apparatus," "communication system," and "communication method" have been used, but this is simply for convenience in describing the embodiments, and terms such as "multicarrier communication system," "communication apparatus," "communication control method" and the like may, of course, also be used.

The type, number, connection method, and so forth of circuit blocks configuring an above-described base station apparatus are not limited to those in the above embodiments.

As described above, according to the present invention, a power measurement pilot is also used as a timing detection symbol, it is possible to use only a one-symbol control channel area in one frame, and the data part transmission amount is large. Consequently, a base station apparatus, communication terminal apparatus, communication system, and communication method can be implemented that enable the data part transmission amount to be increased.

Therefore, a base station apparatus, communication terminal apparatus, communication system, and communication method according to the present invention are useful as a base station apparatus, communication terminal apparatus, and associated communication method not only in an OFDM system but also in multicarrier communications in other than an OFDM system.

What is claimed is:

1. A base station apparatus that performs multicarrier communication, comprising:
    a setting section that provides a one-symbol power measurement pilot in one frame;
    an assignment section that assigns a subcarrier number of said power measurement pilot to each base station apparatus; and
    a transmitting section that transmits said power measurement pilot according to common frame timing among said base station apparatuses, wherein said setting section sets said power measurement pilot as one OFDM symbol in one frame.

2. A base station apparatus that performs multicarrier communication, comprising:
    a setting section that provides a one-symbol power measurement pilot in one frame;
    an assignment section that assigns a subcarrier number of said power measurement pilot to each base station apparatus; and
    a transmitting section that transmits said power measurement pilot according to common frame timing among said base station apparatuses, wherein said assignment section assigns an even number to a first base station apparatus, and sequuentially assigns other hitherto unassigned even numbers to other base station apparatuses.

3. A base station apparatus that performs multicarrier communication, comprising:
    a setting section that provides a one-symbol power measurement pilot in one frame;
    an assignment section that assigns a subcarrier number of said power measurement pilot to each base station apparatus; and
    a transmitting section that transmits said power measurement pilot according to common frame timing among said base station apparatuses, wherein said assignment section assigns an odd number to a first base station apparatus, and sequentially assigns other hitherto unassigned odd numbers to other base station apparatuses.

4. A base station apparatus that performs multicarrier communication, comprising:
    a setting section that provides a one-symbol power measurement pilot in one frame;
    an assignment section that assigns a subcarrier number of said power measurement pilot to each base station apparatus; and
    a transmitting section that transmits said power measurement pilot according to common frame timing among said base station apparatuses, wherein said assignment section assigns a subcarrier number to a first base station apparatus, and sequentially assigns other hitherto unassigned subcarrier numbers, offset by a specific number, to other base station apparatuses.

5. The base station apparatus according to claim 4, wherein a specific number of said offset is determined based on a number of cell repetitions in a multi-cell environment.

6. A communication terminal apparatus that performs multicarrier communication, comprising:
    a receiver that receives a power measurement pilot provided as one symbol in one frame;
    an autocorrelator that finds an autocorrelation characteristic of a repeat waveform part that is a repetition of an identical waveform having a cycle of ½ effective symbol length or a waveform with a sign reversed having a cycle of ½ effective symbol length from a received power measurement pilot; and
    a frame timing detector that performs in-phase averaging in frame units of an autocorrelation characteristic of said repeat waveform part and detects positional frame timing of a power measurement pilot on a time axis.

7. The communication terminal apparatus according to claim 6, wherein said receiver receives said power measurement pilot provided as one OFDM symbol in one frame.

8. The communication terminal apparatus according to claim 6, wherein said autocorrelator finds an autocorrelation characteristic of a length resulting from adding together a guard interval length and ½ effective symbol length.

9. The communication terminal apparatus according to claim 6, further comprising a base station selector that performs a subcarrier power calculation, adds power values of a pilot of an identical base station arranged on each frequency of a plurality of offsets, and communicates with a base station with a highest power.

10. A communication system that performs multicarrier communication, wherein:
a base station apparatus comprises:
a setter that provides a one-symbol power measurement pilot in one frame;
an assignor that assigns a subcarrier number of said power measurement pilot to each base station apparatus; and
a transmitter that transmits said power measurement pilot according to a common frame timing among said base station apparatuses, and
a communication terminal apparatus comprises:
a receiver that receives a power measurement pilot provided as one symbol in one frame;
an autocorrelator that finds an autocorrelation characteristic of a repeat waveform part that is a repetition of an identical waveform having a cycle of ½ effective symbol length or a waveform with a sign reversed having a cycle of ½ effective symbol length from a received power measurement pilot; and
a frame timing detector that performs in-phase averaging in frame units of an autocorrelation characteristic of said repeat waveform part and detects positional frame timing of a power measurement pilot on a time axis.

11. A communication method that performs multicarrier communication, and executes:
on a transmitting side,
providing a one-symbol power measurement pilot in one frame;
assigning a subcarrier number of said power measurement pilot to each base station apparatus; and
transmitting said power measurement pilot according to common frame timing among said base stations, and
on a receiving side,
receiving a power measurement pilot provided as one symbol in one frame;
finding an autocorrelation characteristic of a repeat waveform part that is a repetition of an identical waveform having a cycle of ½ effective symbol length or a waveform with a sign reversed having a cycle of ½ effective symbol length from a received power measurement pilot; and
performing in-phase averaging in frame units of an autocorrelation characteristic of said repeat waveform part and detecting positional frame timing of a power measurement pilot on a time axis.

* * * * *